US011046523B2

(12) United States Patent
Steffen et al.

(10) Patent No.: US 11,046,523 B2
(45) Date of Patent: Jun. 29, 2021

(54) PLATE CONVEYOR AND TRANSPORT ATTACHMENT FOR SUCH A PLATE CONVEYOR

(71) Applicant: Interroll Holding AG, Sant' Antonino (CH)

(72) Inventors: Jonas Steffen, Erkelenz (DE); Siegmund Dudek, Heinsberg (DE); Eduard Hartl, Moenchengladbach (DE)

(73) Assignee: INTERROLL HOLDING AG

( * ) Notice: Subject to any disclaimer, the term of this patent is extended or adjusted under 35 U.S.C. 154(b) by 0 days.

(21) Appl. No.: 16/613,168

(22) PCT Filed: Apr. 23, 2018

(86) PCT No.: PCT/EP2018/060365
§ 371 (c)(1),
(2) Date: Nov. 13, 2019

(87) PCT Pub. No.: WO2018/210532
PCT Pub. Date: Nov. 22, 2018

(65) Prior Publication Data
US 2021/0078806 A1 Mar. 18, 2021

(30) Foreign Application Priority Data
May 18, 2017 (DE) .................... 10 2017 004 820.7

(51) Int. Cl.
*B65G 21/18* (2006.01)
*B65G 21/16* (2006.01)
(Continued)

(52) U.S. Cl.
CPC .......... *B65G 17/066* (2013.01); *B65G 21/18* (2013.01)

(58) Field of Classification Search
None
See application file for complete search history.

(56) References Cited

U.S. PATENT DOCUMENTS 4,096,943 A * 6/1978 Gentsch ................. B65G 17/12
198/793
5,042,648 A 8/1991 Garvey
(Continued)

FOREIGN PATENT DOCUMENTS

CA 1 217 162 1/1987
CN 104271472 1/2015
(Continued)

OTHER PUBLICATIONS

German Office Action dated Feb. 5, 2018.
International Search Report dated Jan. 22, 2019.
Chinese Office Action dated Aug. 28, 2020.

*Primary Examiner* — Kavel Singh
(74) *Attorney, Agent, or Firm* — Gerald E. Hespos; Michael J. Porco; Matthew T. Hespos

(57) ABSTRACT

A transport attachment (1) for a plate conveyor (100; 200) for conveying material includes a transport plate (50) for conveying the material on a transport surface (10) of the transport plate (50). A connection device (40) has a fastening element (42) for fastening the transport attachment (1) to a driven traction element (150) of the plate conveyor (100; 200). At least one lateral supporting surface (41) is used for laterally supporting the transport attachment (1) in a curve of the plate conveyor (100; 200).

22 Claims, 12 Drawing Sheets

(51) Int. Cl.
*B65G 21/00* (2006.01)
*B65G 17/06* (2006.01)

(56) References Cited

U.S. PATENT DOCUMENTS

| | | | | |
|---|---|---|---|---|
| 5,489,020 | A * | 2/1996 | Clopton | B65G 17/086 |
| | | | | 198/851 |
| 6,336,551 | B1 * | 1/2002 | Balk | B65G 17/066 |
| | | | | 198/778 |
| 7,556,142 | B2 * | 7/2009 | Stebnicki | B65G 17/42 |
| | | | | 198/778 |
| 9,126,763 | B2 * | 9/2015 | Henrekson | B65G 15/48 |
| 9,561,907 | B2 * | 2/2017 | Hoang | B65G 21/18 |
| 9,731,898 | B2 * | 8/2017 | Langsdorf | B65G 17/24 |
| 2007/0187213 | A1 | 8/2007 | Garbagnati et al. | |
| 2015/0027858 | A1 | 1/2015 | Brotzmann et al. | |
| 2016/0272431 | A1 | 9/2016 | Hoang et al. | |

FOREIGN PATENT DOCUMENTS

| | | |
|---|---|---|
| DE | 20 2010 012 822 | 12/2010 |
| DE | 10 2011 112 397 | 3/2013 |
| WO | 02/22470 | 3/2002 |
| WO | 2011/156927 | 12/2011 |

* cited by examiner

PLATE CONVEYOR AND TRANSPORT ATTACHMENT FOR SUCH A PLATE CONVEYOR

BACKGROUND

Field of the Invention

The invention relates to a transport attachment, to a traction element, to a plate conveyor, and to a method for conveying material to be conveyed along a plate conveyor.

Related Art

Plate conveyors are used for transporting material to be conveyed on a transport surface that is defined by a plurality of transport plates. The transport plates can be driven by cable pulls and/or by at least one chain. Problems arise in relation to the dissipation of the forces when guiding the driven traction element, such as steel cables and/or conveyor chains, around a curve. One of the forces occurring here is a necking force, which can be described by the Euler-Eytelwein equation. The driven conveyor chain and/or the driven steel cable should be supported, in relation to the necking force, with as little friction as possible in the direction towards the curve midpoint.

The prior art provides this support with a rolling supporting wheel arranged on each chain member of a driven conveyor chain. The axis of rotation of the supporting wheel is substantially vertical. Thus, the chain member can roll towards the curve midpoint.

This known solution reduces the frictional forces on the inner curve by the rolling of the supporting wheels. However, this solution is expensive to implement and has high component costs.

An object underlying the invention is to provide a simplified plate conveyor in which the necking force is dissipated effectively.

SUMMARY

One aspect of this disclosure relates to a transport attachment, a transport cap respectively, for a plate conveyor for conveying material to be conveyed. The plate conveyor comprises a transport plate with a transport surface for conveying the material to be conveyed. The transport attachment comprises a connection device comprising a fastening element for fastening the transport attachment to a driven traction element of the plate conveyor. Furthermore, the transport attachment comprises at least one lateral supporting surface for laterally supporting, bracing respectively, the transport attachment in a curve of the plate conveyor.

The transport attachment is configured and provided to be fastened to the driven traction element of the plate conveyor as part of the plate conveyor. The transport attachment can e.g. be placed onto the driven traction element of the plate conveyor in the form of an attachment and/or slide.

The driven traction element of one embodiment is a driven conveyor chain. In general, another traction element may also be used instead of the conveyor chain, such as a steel cable, a rubber block chain, etc. The transport attachment can be fastened securely to the conveyor chain, in particular at least in a form-fit manner. The traction element is driven along a conveying direction. The term "conveying direction" relates to the running direction and the drive direction of the driven traction element along the conveyor track by the plate conveyor, with the transport plates being arranged in the operating position. In this case, the conveying direction may have both approximately horizontally straight and/or curved conveyor portions, as well as (positive and/or negative) portions inclined out of the horizontal. Furthermore, the conveying direction may also have combinations thereof, i.e. straight and/or curved inclined portions.

The transport attachment may be fastened to the driven traction element such that the transport plate is arranged above and/or over the driven traction element at least in part, and such that the transport surface points up in a substantially vertical direction. The transport surface may be arranged in a substantially horizontal plane. This means that a normal to the transport surface can be substantially vertical. When conveying along an inclined portion, slight deviations may occur from the horizontal or vertical, i.e. in the single-digit or double-digit degree range of less than approximately 45°, in particular less than approximately 25°. However, in an operating position, the transport surface is intended to always be oriented such that the normal to the transport surface points substantially vertically up.

A plurality of structurally identical transport attachments can be arranged on the driven traction element of the plate conveyor. These transport attachments can be arranged one behind the other on the driven traction element, in particular placed thereon. In this case, the transport surfaces of the transport attachments are arranged such that together they form a substantially contiguous, movable conveying surface on which the materials to be conveyed can be conveyed along the plate conveyor.

The transport plate may be slatted and/or may be arranged above the driven traction element substantially transversely to the conveying direction of the plate conveyor in the operating position.

The transport attachment can be fastened to the driven traction element by means of the connection device. In this case, the connection device may in particular be arranged on and/or under the transport plate. In particular, the connection device may be arranged substantially centrally below the transport plate.

The connection device and the transport plate are components of the transport attachment. The transport attachment may comprise additional components, which will be discussed in the following with reference to the embodiments. The connection device comprises the at least one fastening element, by means of which the transport attachment can be fastened to the driven traction element. The fastening can occur in a form-fit and/or in a force-fit manner. The fastening may, for example, take place by a screw connection, a plug-in connection and/or a clamped connection. In particular, the fastening element may comprise a clip element and/or a latching element and/or clamping element for producing an e.g. detachable clipped connection and/or latched connection and/or clamped connection to the traction element. The transport attachment can therefore be clipped on to the traction element, for example.

The connection device may be configured such that the transport attachment can be detached from the traction element. In this case, the connection device is configured for providing a detachable connection. If the transport attachment becomes damaged, this makes it possible to detach just the damaged transport attachment from the traction element and/or to replace the transport attachment with an undamaged transport attachment.

Preferably, the fastening to the traction element is at least form-fitting, such that the fastening element is engaged with the driven traction element. In this case, the fastening element may be configured such that it is specially provided and formed for a predetermined type and/or shape of the conveyor chain. Form-fit fastening allows individual transport attachments to securely follow the track.

The transport attachment may comprise the at least one lateral supporting surface. In particular, the connection device may comprise the lateral supporting surface. The supporting surface is configured and provided to absorb the majority of the forces that are directed towards the curve midpoint of the curve and that occur during guidance around a curve along the plate guide. The lateral supporting surface may provide a rolling surface for the curve forces. The lateral supporting surface may in particular be used to absorb the necking forces, which are described by the Euler-Eytelwein equation. In this case, the lateral supporting surfaces of the transport attachments can absorb at least 50% of the necking forces, preferably at least 75% of the necking forces, and particularly preferably at least 95% of the necking forces that occur.

The lateral supporting surface may be configured such that the supporting surface points in a lateral direction, i.e. substantially laterally relative to the conveying direction of the plate conveyor. In other words, a normal to the lateral supporting surface may be substantially transverse to the conveying direction and substantially horizontal.

The lateral supporting surface may, for example, be provided by the connection device, i.e. may be configured to be part of the connection device. The lateral supporting surface may be substantially planar, or alternatively the supporting surface may be slightly curved, in particular slightly concave, to adapt better to a predetermined curve shape. In this case, the supporting surface may have a vertical height that is sufficient for stationary supporting rollers to roll on the supporting surface. In this case, the vertical height of the supporting surface may be at least as large as the vertical wheel width of predetermined, stationary supporting rollers, preferably at least 125% as large as said wheel width. The supporting surfaces are configured and provided to allow such stationary supporting rollers, which can be fastened to the plate conveyor in a stationary, fixed manner, to roll on the lateral supporting surfaces. Each stationary supporting rollers may be oriented such that the axis of rotation points in a substantially vertical direction. If the conveying surface has an incline, the axis of rotation may deviate slightly from the vertical orientation, in particular in the single-digit or double-digit degree range of less than approximately 45°, in particular less than approximately 25°.

By providing the static, non-driven supporting rollers and the movable lateral supporting surface, frictional forces occurring in the curve can be reduced sufficiently.

Compared with the conventional plate conveyor described at the outset, the transport attachment e.g. has the advantage that the lateral supporting rollers no longer have to be moved and driven together with the traction element. On the one hand, this reduces the driven weight. On the other hand, the total number of lateral supporting rollers required can be reduced. In order to dissipate the curve forces in a rolling manner, (static) lateral supporting rollers are required only in the curves of the plate conveyor, and not along substantially straight segments of the plate conveyor and/or along return segments of the traction element.

In conventional plate conveyors in which the lateral supporting rollers are fastened to each chain member and are conveyed together therewith, lateral supporting rollers (which are conveyed together therewith) are formed both in the curves and in the straight segments, as well as along return segments of the plate conveyor.

The lateral supporting surfaces also make it possible for the curve forces, such as the necking force, not to act directly on a side surface of the traction element, but on the lateral supporting surface of the transport attachment. Therefore, the entire traction element, such as a conveyor chain or the respective chain member, is not stressed in the form of a wear part, but instead only the transport attachment, which is essentially easier to replace, or more precisely the lateral supporting surface thereof, is stressed. This can improve and/or simplify the repair of wear parts.

The lateral supporting surface may be configured to interact with a non-conveyed lateral supporting roller that is fixed to the plate conveyor in a stationary manner. Alternatively or additionally, the lateral supporting surface may be configured to interact with a stationary lateral stop, such as a guide rail, that is fixed to the plate conveyor in a stationary manner. In particular, the lateral supporting surface may be configured and provided to interact with stationary lateral supporting rollers, at least in curves of the plate conveyor, and to interact with a stationary lateral stop on straight portions.

According to an embodiment, the lateral supporting surface is configured to absorb the majority of the necking forces directed towards the curve midpoint of the curve. In this case, the lateral supporting surfaces of the transport attachments can absorb at least 50% of the necking forces, preferably at least 75% of the necking forces, and particularly preferably at least 95% of the necking forces that occur.

The lateral supporting surface of one embodiment is arranged such that a normal to the lateral supporting surface in a curve of the plate conveyor points substantially horizontally relative to the midpoint of the curve. Accordingly, the normal points towards the spiral axis during guidance along the spiral of the plate conveyor. In other words, the lateral supporting surface may be arranged on the side of the traction element that is arranged on the inside of the traction element during guidance around a curve.

In the operating position, the lateral supporting surface of one embodiment is arranged in a plane that is spanned by the conveying direction of the plate conveyor and by a vertical direction. In general, the operating position corresponds to a position in which the transport attachment (or a plurality of e.g. structurally identical transport attachments one behind the other) is arranged on the driven traction element of the plate conveyor and the traction element is arranged in a target position along a predetermined conveyor track along the plate conveyor. The lateral supporting surface of the transport attachment can always be oriented and arranged in the plate conveyor in a substantially vertical plane, irrespective of the position of the transport attachment along the conveyor track in the plate conveyor.

The traction element of one embodiment is configured as a conveyor chain and the fastening element for receiving at least one chain member of the conveyor chain is configured such that the lateral supporting surface is adjacent to the respectively received chain member such that, when the conveyor chain is conveyed around a curve, the lateral supporting surface is arranged between the received chain member and a curve midpoint. In other words, in the operating position, the lateral supporting surface is arranged beside the received chain member, in particular in the form of a side, i.e. lateral, limit stop beside the received chain member. In this case, the lateral supporting surface is arranged on the side of the received chain member that points towards the curve midpoint of the curve during guidance around the curve. In other words, the lateral supporting surface is arranged between the received chain member and the curve midpoint of the curve. If the plate conveyor is able to convey along a spiral curve track, the lateral supporting surface is arranged along the spiral curve track between the received chain member and the spiral axis of the spiral curve track. Owing to this arrangement, the curve forces can be supported particularly advantageously.

The transport attachment may comprise a single lateral supporting surface on one side of the driven traction element, or may comprise one lateral supporting surface on either side of the driven traction element in each case. In this second case, the two lateral supporting surfaces point laterally out away from the received traction element, e.g. a chain member. Owing to two lateral supporting surfaces being provided on either side of the traction element, the plate conveyor can be guided particularly advantageously both in left-hand curves and in right-hand curves. In principle, however, an embodiment is possible in which the lateral supporting surface is arranged only beside the driven traction element on one side, in particular in plate conveyors that only are guided in one and the same curve direction along the conveying path thereof.

The transport attachment may be configured for connection to a single driven traction element, or may comprise a connection device for two or more driven traction element. In this case, a single connection device may be provided for connection to the two or more driven traction element, or, however, a separate connection device may be provided for each traction element. In the embodiment having the at least two driven traction elements, a lateral supporting surface may be formed on the respective inside of the curve beside each individual traction element. Alternatively, in the embodiment having the at least two driven traction elements, just one single lateral supporting surface may also be provided in total. When using a plurality of driven traction elements, the design having at least one lateral supporting surface per traction element is sensible, however, in order to guide each individual driven traction element particularly favorably, advantageously and/or precisely.

The lateral supporting surface of one embodiment comprises a surface end at the front in the conveying direction and a surface end at the rear in the conveying direction. In this case, the shapes of the two surface ends are adapted to one another such that the rear surface end of the supporting surface can be brought into engagement with a front surface end of a supporting surface of a structurally identical transport attachment that is following in the conveying direction. In this case, the terms "front surface end" and "rear surface end" each relate to the conveying direction of the plate conveyor. If structurally identical transport attachments are used, the front surface end can also be brought into engagement with a rear surface end of a lateral supporting surface of a structurally identical transport attachment that is ahead in the conveying direction. This engagement may include an overlap at least in part. As a result, gap formation between the lateral supporting surfaces can be reduced and/or prevented. Furthermore, owing to this at least partial overlap and/or engagement, the supporting surfaces can be interconnected such that a substantially contiguous contact surface is formed for the rolling curve forces. For example, one of the two surface ends may comprise a recess and the other may comprise a projection, with the recess being formed to receive the projection of a structurally identical transport attachment.

The transport attachment may be formed in one piece, i.e. monolithically. Furthermore, the transport attachment may be formed in precisely two pieces or at least two pieces, with attachment consisting of or comprising the transport plate and the connection device, for example.

Another aspect of this disclosure relates to a transport attachment for a plate conveyor for conveying material to be conveyed. The plate conveyor may comprise a transport plate for conveying the material to be conveyed on a transport surface of the transport plate. The transport attachment of this embodiment comprises a connection device comprising a fastening element for fastening the transport attachment to a driven traction element of the plate conveyor. In this case, the transport plate is asymmetrical, such that the width of the transport plate in the conveying direction of the plate conveyor on an inner plate end is smaller than the width of the transport plate in the conveying direction of the plate conveyor on an outer plate end.

A transport attachment according to this aspect may be implemented by a transport attachment according to the above-described aspect of this disclosure. Therefore, all the statements made regarding the above-described aspect may also apply to the asymmetrical transport attachment.

In this case, the transport plate is of asymmetrical design, such that the inner plate end is narrower than the outer plate end. In this case, the terms "inner" and "outer" relate to the positions of the respective lateral plate ends in a curve, along which the driven traction element of the plate conveyor is guided. In this case, the transport attachment is provided and configured for a plate conveyor that always turns in the same curve direction (to the right or the left) along the conveying path thereof. In this case, when guided around a curve, the inner plate end always is associated with the curve midpoint or a spiral axis, whereas the outer plate end always is arranged to be facing away from the curve midpoint or the spiral axis.

The asymmetry of the transport plate may allow for gap-free guidance around a curve. Here, "gap-free" can mean that, even when the plate conveyor is guided around a curve, a person's finger cannot fit between the transport plates of the transport attachments, perpendicularly to the conveyor plate. This is applicable even on an outer curve of the course of the track of the plate conveyor, on which gaps may open up between the individual transport plates in conventional plate conveyors. When guided over straight segments, the transport plates of successive transport attachments can overlap at least in part, such that a substantially closed conveying surface is formed, which is composed of the individual transport surfaces of the successive transport attachments.

When guided around a curve, the transport plates can be pushed together and/or fanned together more tightly along the shorter inside of the curve than on the outside of the curve. At least on the inside of the curve, the transport plates may have been and/or are pushed over one another at least in part. The successive transport plates may be pulled apart on the outside of the curve. The asymmetrical transport plates are configured to be wider on the outside of the curve, such that, even when the plates are pulled apart to a relatively great extent on the outside of the curve, a gap does not open up between the transport plates. In this way, the entire conveying surface can be gap-free.

In general, in the operating position, the transport plates of successive transport attachments may be arranged to overlap at least in part and/or may be arranged over one another at least in part. When guided around a curve, they can be fanned out at least in part.

The asymmetrical design of the transport plates allows for particularly secure, substantially gap-free conveying by means of the plate conveyor.

The width of the transport plate in the conveying direction can increase substantially continuously, for example from the inner plate end to the outer plate end and/or from the inner plate end to a central part of the transport plate and/or from a central part of the transport plate to the outer plate end.

According to an embodiment of this transport attachment, the transport plate is at least 20% wider on the outer plate end in the conveying direction than on the inner plate end. This considerable widening allows for sufficient guidance around a curve, with a substantially gap-free conveying surface of the plate conveyor. For a smaller widening, i.e. for less heavily pronounced asymmetry, the gap-free surface is made possible only in highly sweeping curves that require a lot of space for a plate conveyor. For a space-saving plate conveyor having tight guidance around curves, in particular for a plate conveyor configured as a spiral lift, the described widening by at least 25% is advantageous.

The transport plate may be fastened form-fittingly to the connection device. In this case, the transport plate and the connection device may be formed of different materials, e.g. of plastics materials that have different fiber proportions. As a result, the two components can be adapted to the respective mechanical requirements.

The transport plate may be fastened detachably to the connection device by a lockable and/or latchable rail guide to provide the form-fitting connection. The rail guide can be configured to be latchable, i.e. to snap into place. Alternatively or additionally, it is possible for the rail guide to be lockable and unlockable. In this case, one of the two components, e.g. the connection device, may comprise a groove in the form of an elongate recess and the other of the two components, e.g. the transport plate, may comprise a tongue in the form of an elongate projection. This tongue-and-groove connection can be secured, e.g. by a latching element and/or by a bar element. Each of the two components may also comprise both an elongate recess and an elongate projection, e.g. to reinforce the rail guide. A joining direction of the rail guide may be arranged counter to the conveying direction, as a result the transport plate is pressed against an end stop in operation and a flow of force occurring in operation can be dissipated via the end stop. To detach the two components from one another, a lock (e.g. a clip) can be unlocked and the transport plate can be removed from the rail guide counter to the conveying direction. As a result, the traction element and the connection device are accessible particularly rapidly and/or easily for maintenance purposes. Furthermore, the connection device may be particularly easy to separate from the traction element to replace wear parts.

According to another embodiment, the transport plate is connected cohesively to the connection device, for example using a welding joining process. In this case, the transport plate and the connection device may be formed of different materials, e.g. of plastics materials having different fiber proportions. This results in improved adaptation to the respective mechanical requirements.

The connection device may be arranged substantially centrally below the transport plate. The guidance of the conveyor chain by a substantially centrally arranged connection device has proven to be particularly advantageous and convenient with respect to the resulting traction forces and in particular curve forces.

The transport plate of one embodiment comprises two wings that are arranged to extend away from a central region of the transport plate transversely to the conveying direction of the plate conveyor. In this case, the transport attachment comprises at least one load-bearing roller per wing of the transport plate, each of the load-bearing rollers comprises a substantially horizontal axis of rotation. The load-bearing rollers can bear or support the weight force of the transport attachment, the traction element and/or the material to be conveyed that is placed on the transport surfaces. In this case, the load-bearing rollers are arranged below the transport plate in the form of wheels. By providing at least one load-bearing roller per wing, particularly secure support is provided by the transport surface.

The wings may each be configured as half of the transport plate, for example an inner half of the transport plate and an outer half of the transport plate. "Inner" and "outer" refer to the position of the respective wing during guidance around a curve along the plate conveyor. The wings are arranged such that they point away from the substantially centrally arranged central region in a lateral direction transverse to the conveying direction towards an inner or outer plate end of the transport plate. The connection device may be arranged on the central region. Each load-bearing roller may be fastened to the respective wing, in particular to the underside of the transport plate, by means of a load-bearing apparatus. The load-bearing rollers are used to support and/or roll the weight force in a load-bearing manner, in particular in a substantially vertical direction.

A plurality of supporting points may be formed on each wing below the transport plate to apply at least one load-bearing roller in each case. In other words, one or more load-bearing rollers can be attached to each wing and/or one load-bearing roller in each case can be provided at different supporting points. In this case, the different supporting points of a wing are at different distances from the central region and/or from each assigned lateral plate end.

Depending on the shape, size and/or weight of the material to be transported and/or according to the lateral extension of the transport plates, the load-bearing rollers can be applied to the wings laterally on the inside and/or laterally on the outside and/or laterally centrally. For a high expected weight load, two, three or more load-bearing rollers may also be provided per wing to absorb and distribute the weight force more effectively. In this case, transport attachments of the plate conveyor that are in succession in the conveying direction may have a different number of load-bearing rollers per wing. Furthermore, the load-bearing rollers of transport attachments of the plate conveyor that are in succession in the conveying direction may be arranged at different supporting points. In other words, the transport attachments of a plate conveyor may be configured in a modular manner, with a selectable number of load-bearing rollers in at least one selectable position below the wings. This makes it possible to adapt the transport attachment in a modular manner to individual circumstances on site.

The transport plate of one embodiment is stepped in the conveying direction such that a rear plate end of the transport plate overlaps at least in part with a front plate end of a transport plate of a structurally identical transport attachment that is following in the conveying direction. In the same way, the front plate end of the transport plate can overlap at least in part with a rear plate end of a transport plate of a structurally identical transport attachment that is ahead in the conveying direction. In this case, the terms "rear" and "front" each relate to the conveying direction of the plate conveyor. The stepped overlap makes it possible to prevent and/or reduce gaps between the transport plates of the transport attachments. In this embodiment, the transport plate is not formed solely to have a smooth surface, but instead has at least one step and thus a recess and/or a lowered surface that can overlap, when viewed in a vertical direction, with a projection and/or raised surface of a transport attachment that is ahead or is following. In this case, for example, at least 25%, preferably at least 35%, of the transport plate can be formed as a vertically lowered surface. In the operating position, this lowered part of the transport plate can be arranged, at least in part, under a raised surface (in the form of a transport surface) of a transport plate of a structurally identical transport attachment that is ahead or is following in the conveying direction.

In addition, for example, at least 25%, preferably at least 35%, of the transport plate can be formed as a vertically raised surface (in the form of a transport surface). In the operating position, this raised part of the transport plate can be arranged, at least in part, over a lowered surface of a transport plate of a structurally identical transport attachment that is ahead or is following in the conveying direction.

Another aspect of this disclosure relates to a traction element for a plate conveyor comprising a plurality of transport attachments according to any of the preceding embodiments that are fastened to the traction element. The transport attachments may be fastened to the traction element at equal distances from one another along the entire traction element. Furthermore, the transport attachments may all be fastened to the traction element with the same orientation, i.e. for example such that the transport surfaces of the transport attachments form a substantially contiguous conveying surface. In this case, the transport attachments can overlap at least in part. The traction element may be closed, i.e. may be circular, for example. The traction element may be a driven conveyor chain. In this case, a transport attachment may be provided at every individual, every second or every third chain member of the conveyor chain. A transport attachment may be fastened to each individual chain member.

According to an embodiment of the traction element, the transport attachments are fastened to the conveyor chain one behind the other in the conveying direction of the plate conveyor so closely that the transport plates of successive transport attachments overlap with one another in a gap-free manner when being guided around a curve along a predetermined curve shape.

In general, the plate conveyor may include at least one change in direction of the conveying direction, i.e. at least one curve having a change in direction of at least 90°. The successive transport plates overlap in a substantially gap-free manner along such a curve having a predetermined curve radius. This means that a person's fingers no longer fit between the individual transport plates.

One aspect of the disclosure relates to a plate conveyor comprising a traction element as described above. The plate conveyor comprises a drive, such as a motor, that drives the traction element along a predetermined traction path and/or conveyor path. The transport attachments are fastened to the driven traction element and are driven together with the traction element to move along the predetermined traction path and/or conveyor path.

The traction element may be guided along a spiral curve track by the plate conveyor. In this case, at least in one position, the plate conveyor comprises a spiral curve track, i.e. a curve having a slope. On this spiral curve or spiral curve track, material to be conveyed can be transported up and/or down along the spiral curve on the conveying surface formed by the transport surfaces of the transport attachments. In particular, the material to be conveyed can be transported up by the spiral curve track in one position and/or can be transported down again in another position of the plate conveyor, in particular along a second spiral curve track of the plate conveyor or of another plate conveyor.

In an embodiment of the plate conveyor, the plate conveyor comprises a plurality of supporting rollers arranged on the spiral curve track of the plate conveyor for supporting the lateral supporting surfaces of the transport attachments that are guided and/or driven along the spiral curve track. These lateral supporting rollers are configured as curve supporting rollers that are arranged at and/or on the conveyor track of the plate conveyor so as to be fixed in a stationary manner. In other words, the supporting rollers are not conveyed and/or driven together with the traction element. The curve supporting rollers are used to absorb the curve forces by rolling on the lateral supporting surfaces, conveyed along the spiral curve track, of the transport attachments according to the aspect described at the outset. In this case, the lateral supporting rollers may be arranged substantially centrally along the track, in particular so as to be slightly offset from the center of the conveyor track towards the curve midpoint and/or the spiral axis, such that the lateral supporting surfaces of the transport attachments are guided along the supporting rollers.

The plate conveyor can be configured without supporting rollers in the straight segments and in particular along the return segments of the traction element.

In one embodiment, the spiral curve track is reinforced with metal strips that have a horizontal strip width that is less than approximately 25% of the horizontal track width of the plate conveyor. The metal strips can be used as a raceway for load-bearing rollers on the wings of the transport plates that support the weight force. The metal strips can provide a particularly stable track for load-bearing rollers that are fastened below the transport plates. The metal strips along the spiral curve track are simpler to produce and construct in terms of manufacturing than a completely metal spiral curve track that is made of sheet metal over the entire track width of the spiral curve track. In terms of manufacturing, it is comparatively complex to produce a spiral curve track extending in a screw shape from an initially planar metal sheet. The use of the metal strips provides a simplified manufacturing option for providing a stable contact surface for at least the load-bearing rollers. If necessary, two such metal strips can also be combined if the metal strips also are used for fastening the lateral bearings in addition to their function as a raceway for a roller. In this case, the horizontal strip width is less than approximately 50% of the horizontal track width.

Another aspect relates to a method for conveying material to be conveyed along a plate conveyor, comprising the steps of:

connecting and/or fastening a plurality of transport attachments to a driven traction element of the plate conveyor;

providing a conveying surface for conveying the material to be conveyed which is formed by a plurality of transport surfaces which are provided by transport plates of the transport attachments;

guiding the traction element and the transport attachments attached thereto along a curve; and laterally supporting the transport attachments fastened to the traction element in the curve by means of at least one lateral supporting surface, which is provided by at least one of the transport attachments.

The method can be carried out by a transport attachment or a plurality of transport attachments according to the aspect of the disclosure described at the outset. Therefore, all the statements and remarks made in relation to the above-described transport attachments also apply to the method, and vice versa. In particular, all the transport attachments may comprise at least one arranged lateral supporting surface (in particular arranged on the inside of the curve).

In this context of this invention, the expressions "substantially" and/or "approximately" may be used such that they cover a deviation of up to 5% from a numerical value following the expression, a deviation of up to 5° from a direction following the expression and/or from an angle following the expression.

Unless otherwise specified, expressions such as "top", "bottom", "above", "below", etc., relate to the frame of reference of the Earth in an operating position of the transport attachment and/or of the subject matter of the invention. In this case, the horizontal direction may be oriented approximately in parallel with the conveying surface and the vertical direction may be oriented approximately perpendicularly to the conveying surface.

The term "lateral" relates to a substantially horizontal direction transversely, i.e. substantially perpendicularly, to the conveying direction, and approximately in parallel with the conveying surface.

The term "conveying direction" relates to the running direction and the drive direction of the driven traction element along the conveyor track by the plate conveyor.

The invention will be described in greater detail in the following with reference to exemplary embodiments shown in the drawings. In this case, identical or similar reference signs may denote identical or similar features of the embodiments. Individual features shown in the drawings can be implemented in other embodiments.

DETAILED DESCRIPTION

Figure 1A:
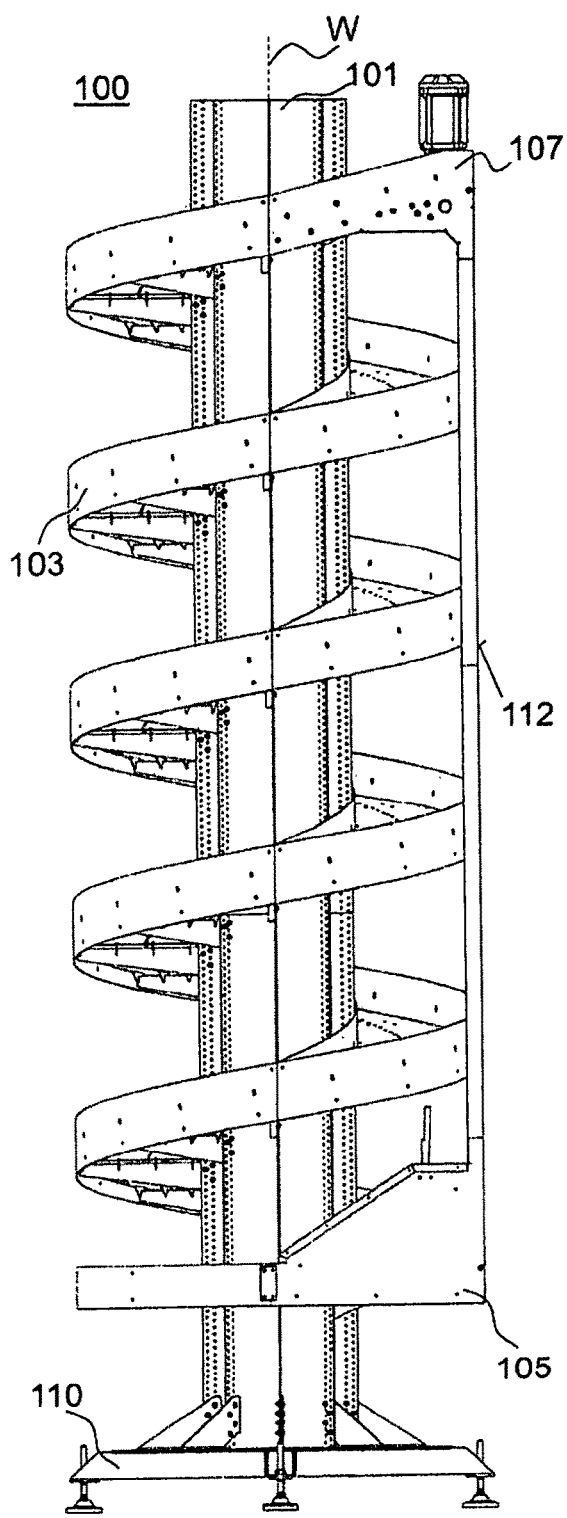
FIG. 1A is a side view of a first plate conveyor for conveying material to be conveyed along a spiral curve track.

FIG. 1A is a side view of a first plate conveyor 100 for conveying material to be conveyed along a spiral curve track 103. The first plate conveyor 100 is not shown in full, but only in part, in FIGS. 1A, 1B, 1C and 1D. In particular, a traction element and transport plates of the first plate conveyor 100 are only shown in part. Instead, the majority of the spiral curve track 103 is shown without transport plates, without a conveyor chain and also without lateral supporting rollers.

The first plate conveyor 100 comprises a base 110 that is configured to provide support on an underside of the plate conveyor 100.

Figure 1B:
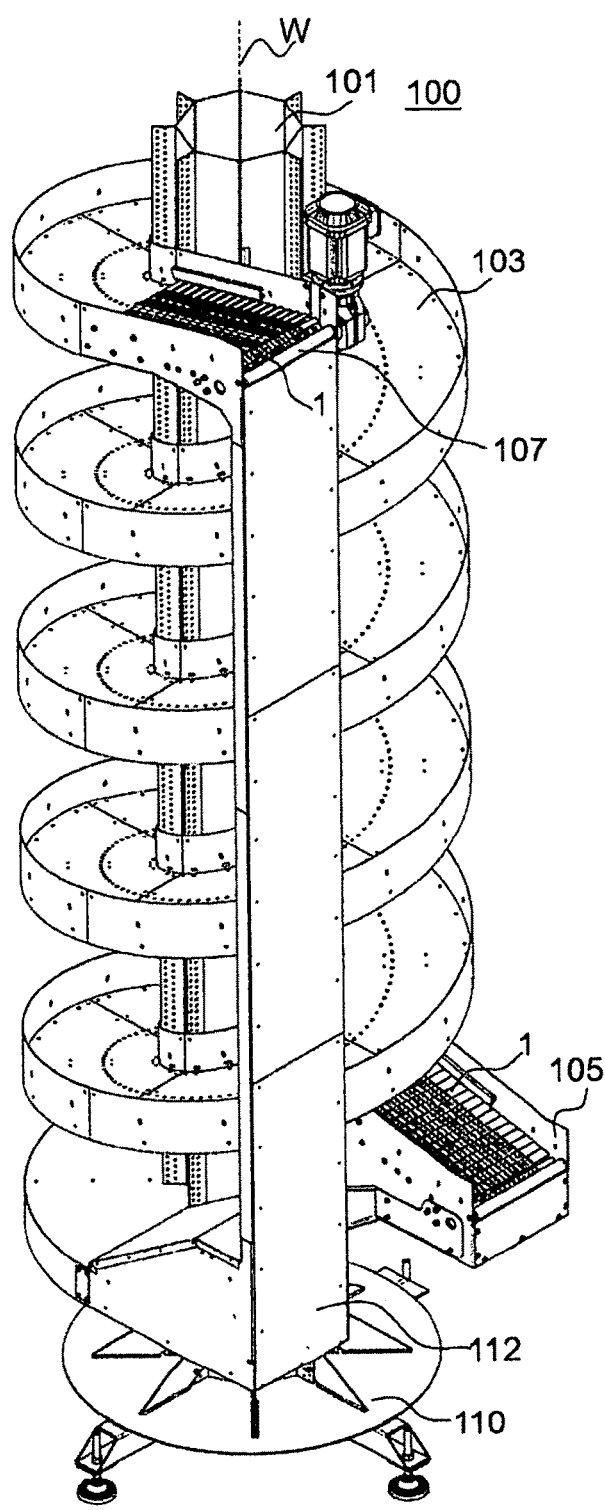
FIG. 1B is a perspective view of the first plate conveyor for conveying material to be conveyed along a spiral curve track.

FIG. 1B is a perspective view of the first plate conveyor 100. In FIG. 1B, some transport attachments 1 are only shown schematically, each of which comprises a transport plate. The transport attachments 1 may be configured as slides and may be attached to a conveyor chain (not shown in FIG. 1), e.g. placed onto the conveyor chain, in the form of traction element of the plate conveyor 100.

The plate conveyor 100 comprises a lower track end 105 and an upper track end 107. The lower track end 105 is connected to the upper track end 107 via a spiral curve track 103. The spiral curve track 103 leads, in a screw shape, from the lower track end 105, around a spiral column 101, along a screw-shaped conveying path to the upper track end 107.

In the exemplary embodiment of the plate conveyor 100 shown, the spiral curve track 103 extends around the spiral column 101 a total of five times. In other embodiments, the spiral curve track 103 may extend around the spiral column 101 more or less than five times. In an embodiment, the spiral curve track 103 may also extend around the spiral column 101 in part, e.g. halfway. A return surface 112 that is inclined substantially vertically back to the lower track end 105 is formed at the upper track end 107.

The plate conveyor 100 may be configured as a spiral lift, for example, on which material to be conveyed can be conveyed from the lower track end 105 to the upper track end 107 along the spiral curve track 103. The plate conveyor 100 may also be operated in the opposite direction, i.e. for conveyance from the top to the bottom along the spiral curve track 103.

A driven conveyor chain of the plate conveyor 100, on and to which the transport attachments 1 are fastened, is not shown in FIGS. 1A and 1B. The conveyor chain is provided as a circulating traction element and is guided and driven from the lower track end 105 to the upper track end 107 along the spiral curve track 103. The return in the closed conveyor chain takes place steeply downwards from the upper track end 105 along the return surface 112 and from a lower end of the return surface 112 along the underside of the plate conveyor 100 back to the lower track end 105. A drive of the conveyor chain may advantageously be formed on a lower or upper region of the plate conveyor 100. Therefore, an upper and/or lower deflection roller of the plate conveyor 100 may for example be configured to be driven, e.g. as a driven roller. These deflection rollers are hidden by the transport plates in FIGS. 1A and 1B and therefore are not shown. A lower deflection roller 160 is shown in FIG. 1D, for example, and may be configured as a driven roller. The drive may be configured at least in part as a drive that is arranged outside a deflection roller, for example as a gear motor, as at least one deflection roller having an inner motor, which may for example be configured as a barrel motor.

On the plate conveyor 100 shown, material to be conveyed can be conveyed up in a vertical direction and/or also down in a vertical direction along the spiral curve track 103.

The screw-shaped conveyor track and/or track surface of the plate conveyor 100 extends along the spiral curve track 103 around a spiral axis W of the plate conveyor 100 that is indicated in FIGS. 1A and 1B and approximately coincides with a cylinder axis of the spiral column 101. In a view from above, the spiral axis W constitutes a curve midpoint, around which the conveyor chain and thus also the transport attachments 1 are guided.

Figure 1C:
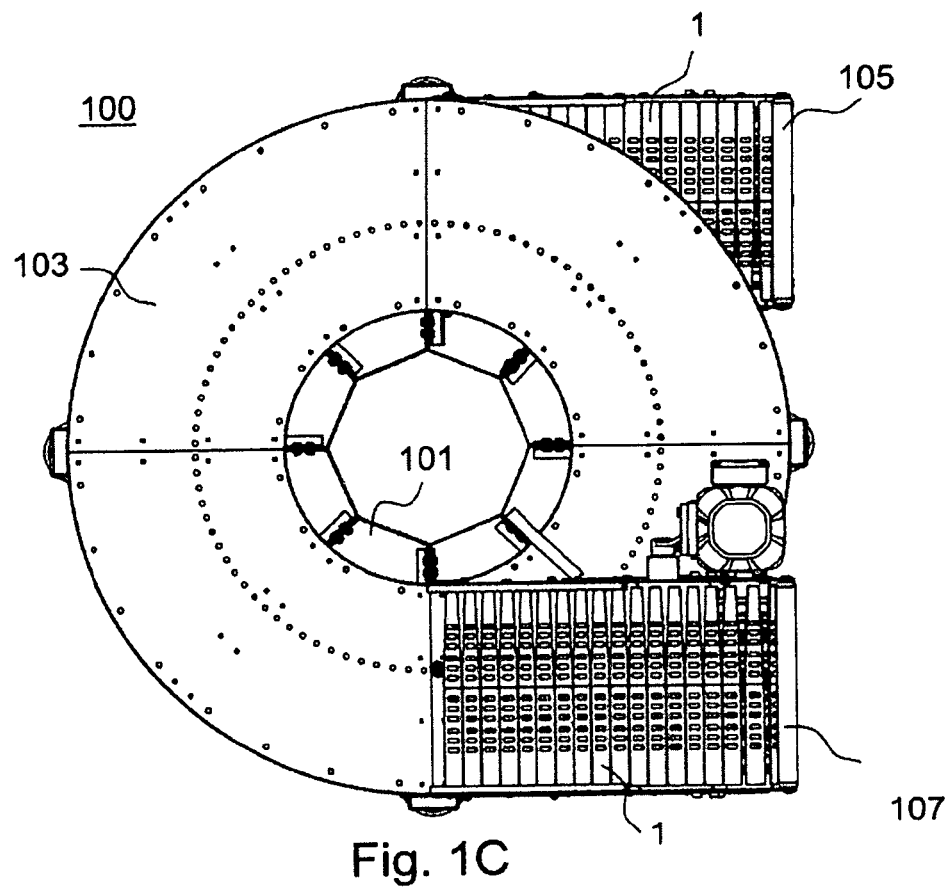
FIG. 1C is a view from above of the first plate conveyor for conveying material to be conveyed along a spiral curve track.
Figure 1D:
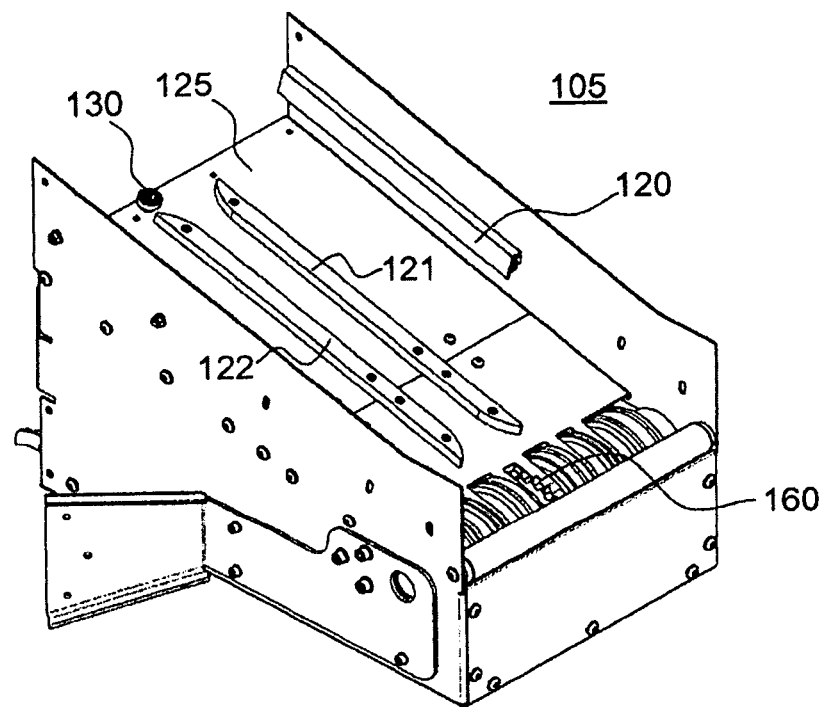
FIG. 1D is a perspective view of a lower track end of the first plate conveyor for conveying material to be conveyed along a spiral curve track.

FIG. 1C is a view from above of the plate conveyor 100. FIG. 1C also only shows a few of the transport attachments 1 comprising the transport plates, namely those on the upper track end 107 and on the lower track end 105. The transport attachments 1 together with the transport plates are not shown along the spiral curve track 103, but instead are omitted from the illustration. Screw holes for fastening static, lateral supporting rollers are formed along the spiral curve track 103.

FIG. 1D is a perspective view of the lower track end 105 of the plate conveyor 100, without the conveyor chain and without transport attachments 1. In the portion of the conveyor track shown, two rails are arranged and formed on a track surface 125 of the plate conveyor 100. The rail which is arranged closer to the spiral axis W is configured as an inner chain guide 122. The other rail, which is arranged further distanced from the spiral axis W, is configured as an outer chain guide 121.

The conveyor chain is guided between the two chain guides 121 and 122 configured as rails along the straight portion of the conveyor track shown. In curved portions, in particular along the spiral curve track 103, in order to reduce friction and to absorb the necking forces, the conveyor chain is not guided in such rails, but on lateral supporting rollers 130 arranged on the inside of the curve of the conveyor chain.

FIG. 1D merely shows one single lateral supporting roller 130 in the extension of the inner chain guide 122. In this case, the axis of rotation of the lateral supporting rollers 130 is substantially perpendicular to the track surface 125. Therefore, the axes of rotation of the lateral supporting rollers are arranged substantially in parallel with a vertical direction, and more specifically so as to be offset from the vertical direction by the incline of the track surface 125.

The lateral supporting surfaces of the transport attachments 1 fastened to the conveyor chain rest on the lateral supporting rollers 130 and are guided past said rollers on the outside of the curve. In this case, the statically fixed lateral supporting rollers 130 can roll on lateral supporting surfaces of the transport attachments 1 in order to absorb the curve forces.

The lateral supporting rollers 130 may be configured as horizontal ball bearings which absorb the necking forces and dissipate them in a rolling manner. As a result, negative effects of the occurring forces to be dissipated on the components of the plate conveyor 100 and 200 are reduced.

An elongate side guide 120 is formed e.g. as a rail on a lateral side flange (e.g. on the outside of the curve) of the track surface 125, below which rail the transport attachments 1 can be guided through. This side guide 120 can prevent and/or reduce any lifting of the transport attachments 1. Such a side guide 120 can likewise be arranged on an opposite side (on the inside of the curve), which is hidden in the perspective shown in FIG. 1D. The side guides 120 may be formed along the entire track surface 125 as contact protection between the lateral side flange and the transport attachments 1 and/or as lift protection. The side guides 120 may be configured as a hollow profile, for example. The lateral width of the conveyor track above the track surface 125 is reduced at the side guides 120 to the extent that the lateral, that is to say e.g. the inner and outer, plate ends of the transport attachments 1 are arranged below the side guides 120.

Figure 2A:
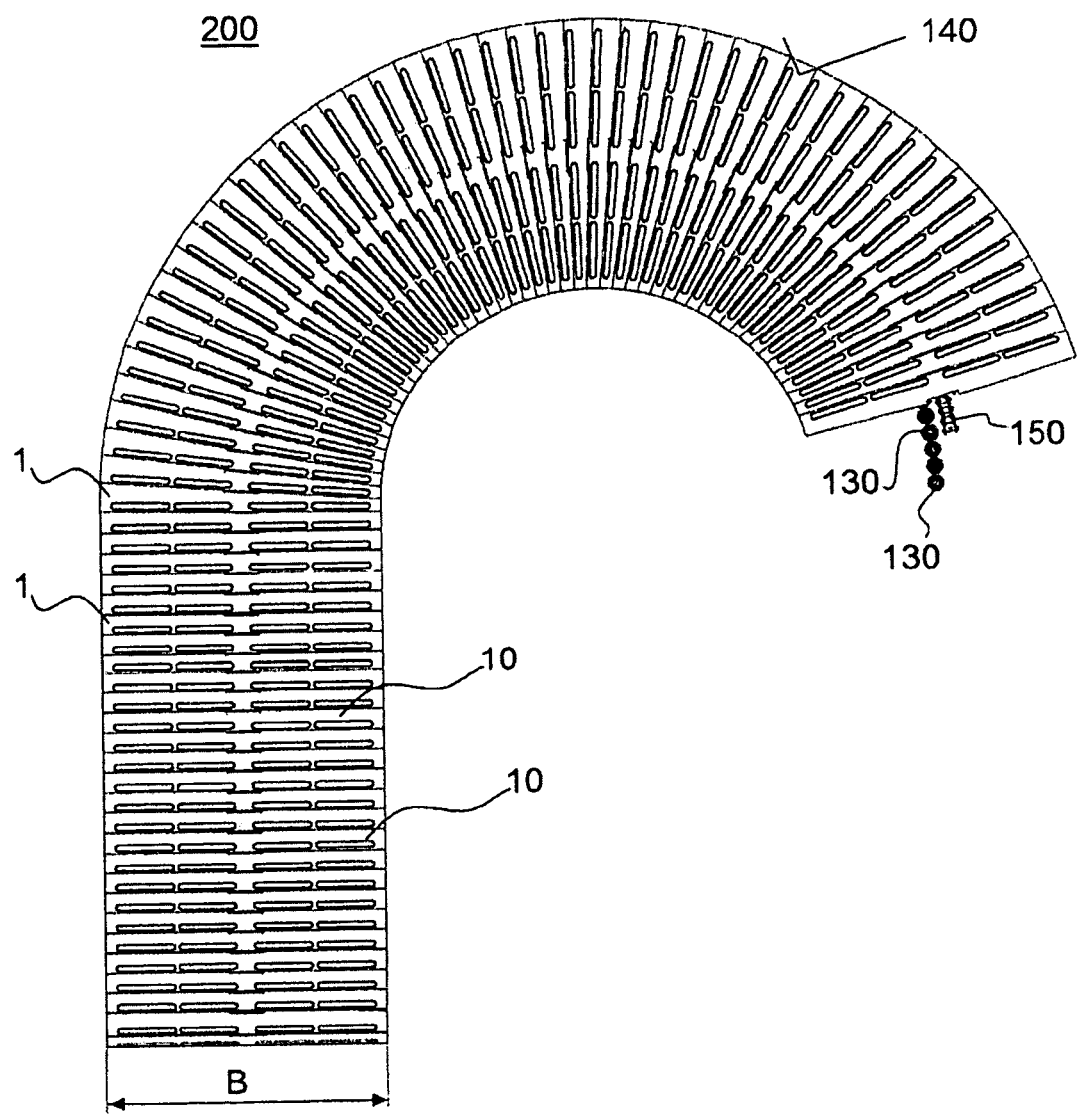
FIG. 2A is a view from above of a second plate conveyor comprising a conveying surface which is guided around a curve.

FIG. 2A is a view from above of a second plate conveyor 200 comprising a conveying surface 140 which is formed and/or guided around a right-hand curve. In this figure, the second plate conveyor 200 is not shown in full, but merely in part. FIG. 2A shows a plurality of transport attachments 1, which are fastened to a driven conveyor chain 150 in the form of traction element. Each transport attachment 1 comprises a transport plate comprising a transport surface 10. The transport surfaces 10 of all the transport attachments 1 together form the conveying surface 140. In this case, the transport surfaces 10 of the transport attachments 1 driven in the forward direction are arranged substantially in the same plane, with it being possible for successive transport surfaces 10 to overlap in part. The transport surfaces 10 of the transport attachments 1 that are returned straight away and therefore can be arranged overhead (not shown in FIG. 2A) may be arranged other than in the plane of the conveying surface 140.

In the exemplary embodiment shown in FIG. 2A, the conveyor chain 150 is first driven along a straight portion of the conveyor track, at which point the conveyor chain 150 is guided around a curve, which is formed as a right-hand curve in the embodiment and, over the course thereof, changes the conveying direction by approximately 180°. In the embodiment of the plate conveyor 200 shown, material to be conveyed is conveyed substantially in the same plane, namely a substantially horizontal plane which is spanned by the transport surfaces 10 oriented for conveying in the forward direction. The conveying in a horizontal plane takes place in a similar manner to the conveying along the spiral curve track 103 of the first plate conveyor 100 shown in FIG. 1A to 1D.

Each transport attachment 1 provides a transport surface 10, which has a greater extension in a direction substantially transverse (i.e. lateral) to the conveying direction than in the conveying direction. In this case, the conveying direction of a plate conveyor corresponds to the course and the drive direction of the driven conveyor chain 150. The conveyor chain 150 and the transport attachments 1 are movable components of the plate conveyor 200, i.e. they are driven and/or moved relative to statically fixed components of the plate conveyor 200. The statically fixed components of the plate conveyor 200 include the lateral supporting rollers 130, which are arranged along the curve and about which the conveyor chain 150 is guided. The lateral supporting rollers 130 are arranged such that the axis of rotation thereof is arranged substantially in the vertical direction. The lateral supporting rollers 130, together with lateral supporting surfaces of the transport attachments 1, serve to absorb and/or roll the curve forces that need to be absorbed when guiding the driven conveyor chain 150 around a curve.

The transport surfaces 10 project beyond the conveyor chain 150 laterally relative to the conveying direction to the extent that a track width B of the conveyor track is defined by the lateral width of the transport surfaces 10. The track width B is dependent on the lateral extension of the transport plates of the transport attachments 1. Along the plate conveyor 100 and 200, all the transport attachments 1 used each have the same lateral extension, which corresponds to the respective track width B.

During guidance around a curve along the plate conveyor 100 and/or 200, the transport plates are forced together, over and under one another, on the inside of a curve, whereas they are fanned out from one another on the outside of a curve. Here, the transport plates are configured and/or arranged along the conveyor chain 150 such that they themselves form a substantially gap-free conveying surface 140 when being guided around a curve (e.g. in a view from above).

Figure 2B:
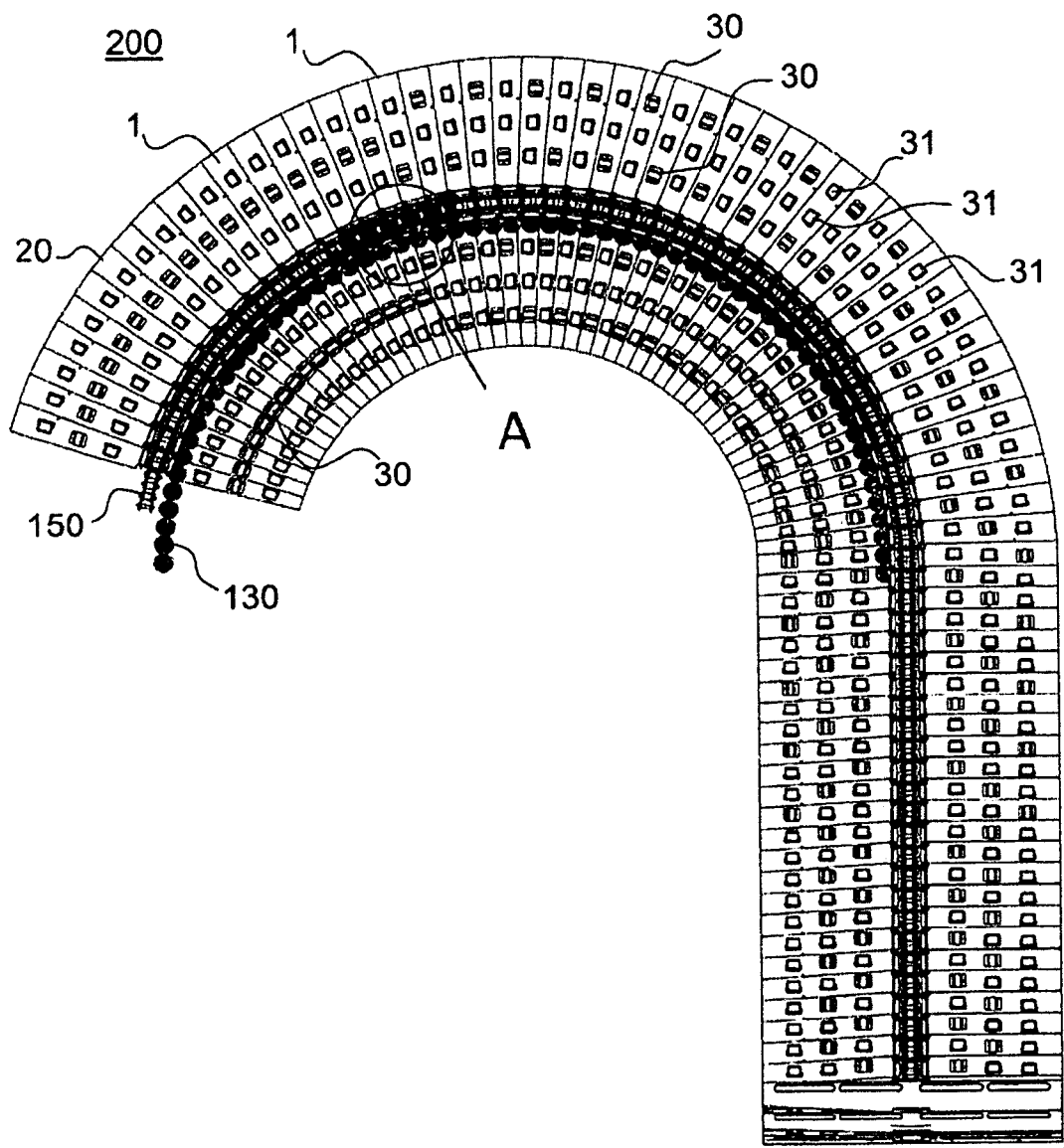
FIG. 2B is a view from below of the second plate conveyor comprising a conveying surface which is guided around a curve.

FIG. 2B is a view from below of the second plate conveyor 200. The lateral supporting rollers 130, which are fastened to a track surface 125 (not shown in FIG. 2B), are only formed for guidance around the curves, but not along the straight segments of the conveyor track of the plate conveyor 200. As a result, the number of supporting rollers required can be reduced compared with conventional plate conveyors.

In the embodiment of the second plate conveyor 200 shown, the lateral supporting rollers 130 are arranged along a semi-circular periphery, such that guidance around a curve takes place with a change in direction of the conveying direction of approximately 180°. The transport plates of the transport attachments 1 comprise an underside 20, which is shown in FIG. 2B. In the embodiment shown, a total of six laterally spaced supporting points 31 are formed on the underside 20 of each transport attachment 1, on which points load-bearing rollers 30 can be arranged. In the embodiment shown, exactly two load-bearing rollers 30 are arranged on each underside 20 of each transport attachment 1, and specifically one load-bearing roller 30 is arranged on each wing. This means that one load-bearing roller 30 is arranged on a wing on the inside of the curve and one load-bearing roller 30 is arranged on a wing on the outside of the curve. Adjacently to a central region of the transport plate and/or the conveyor chain 150, each wing comprises a supporting point 31 for a narrow track width, a supporting point 31 for a wide track width on a lateral plate end, and a supporting point 31 for a medium track width therebetween. A load-bearing roller 30 can be and/or can have been arranged at each of these supporting points 31.

The load-bearing roller 30 can, for example, be formed at the central supporting point 31 of the respective wing, or at a laterally outer supporting point 31 of the respective wing. The arrangement of the load-bearing rollers 30 below the wings may, for example, be identical for the entire plate conveyor 200, may vary from transport plate to transport plate, or may vary at least in part. In the embodiment shown, different supporting points 31 are occupied by a load-bearing roller 30.

In other embodiments, for example, two load-bearing rollers 30 may be provided per wing, or three load-bearing rollers 30 may be provided per wing, such that, for example, plate conveyors can also be achieved in which each transport attachment 1 is provided with a total of six load-bearing rollers 30. This may be useful if a high conveying load is expected. Applying several load-bearing rollers 30 may also make it possible for a relatively wide track width B to be achieved.

A detail denoted by an "A" on the underside of the plate conveyor 200 is subsequently shown so as to be enlarged.

Figure 2C:
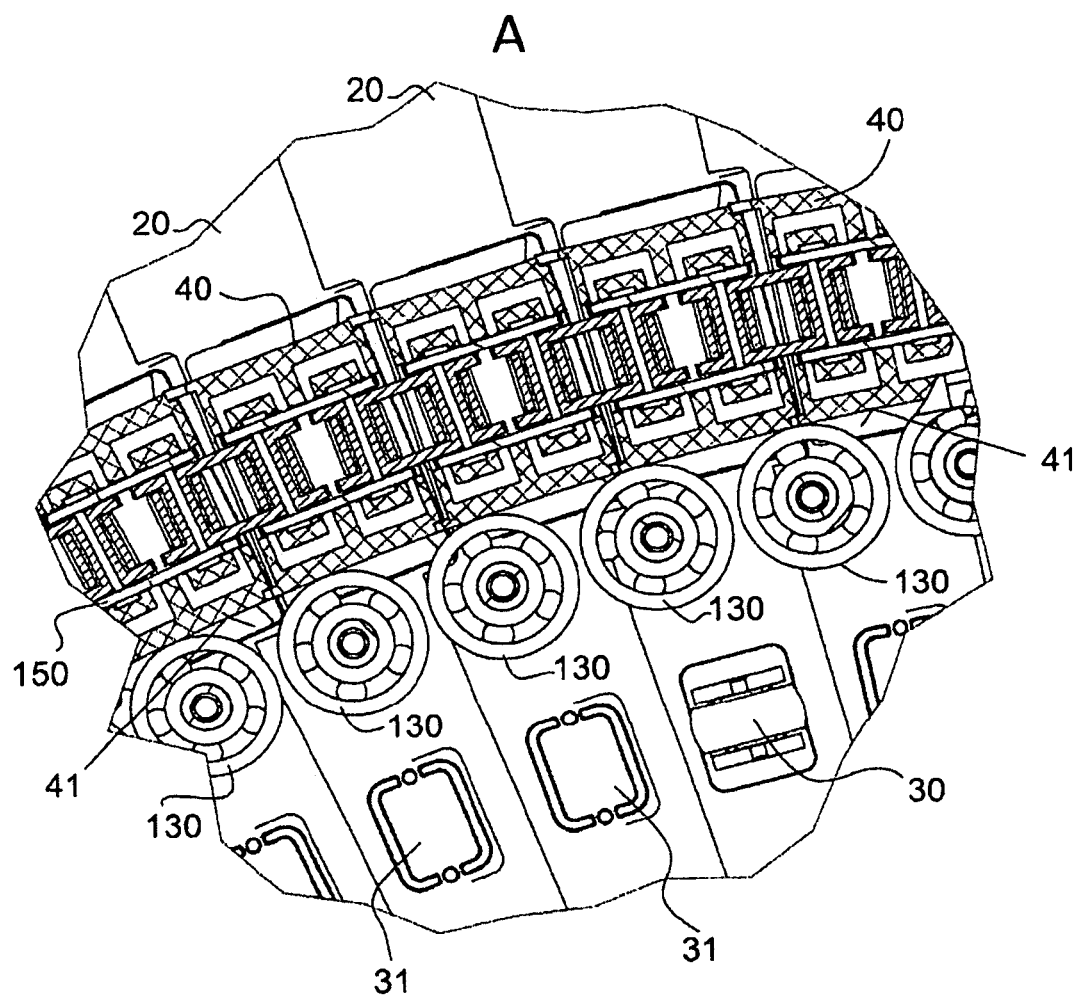
FIG. 2C is a view from below of a detail from FIG. 2B, namely a detail of the underside of the second plate conveyor when being guided around a curve.

FIG. 2C is an enlarged view of the detail A on the underside of the plate conveyor 200. A detail is shown having a plurality of successive chain members of the conveyor chain 150, which is inserted in and fastened to connection devices 40. The connection devices 40 are formed on and attached to the underside of the transport attachments 1. In the embodiment shown, each transport attachment 1 comprises exactly one such connection device 40, which is fastened to at least one chain member of the conveyor chain 150. In this case, the connection devices 40 have a greater lateral extent than the chain members of the conveyor chain 150.

In the context of the invention, "lateral extent" always denotes the extension transversely and/or perpendicularly to the conveying direction, i.e. a direction perpendicular to the driven guidance direction of the driven conveyor chain 150. Likewise, the lateral direction is a substantially horizontal direction.

Each of the connection devices 40 comprises a lateral supporting surface 41, at least on the inside of a curve. The lateral supporting surfaces 41 of the transport attachments 1 together provide a rolling surface for the statically fixed lateral supporting rollers 130. As shown in FIG. 2C, the static lateral supporting rollers 130 do not roll directly on the conveyor chain 150 and thus do not directly wear the conveyor chain 150. Instead, the lateral supporting surfaces 41 wear, which are easier to replace than the conveyor chain 150, e.g. by removing and/or replacing the transport attachment 1. It is also easier to replace the transport attachment 1 than to replace one or more chain members of the conveyor chain 150, since the conveyor chain 150 does not need to be opened when replacing one of the transport attachments 1.

When being guided around a curve, the lateral supporting surfaces 41 provide a contiguous rolling surface that is arranged below the transport plate and is directed towards the plate end on the inside of the curve. Projections and/or recesses which result in a partial overlap of adjacent lateral supporting surfaces 41 may be formed on the lateral supporting surfaces 41, in particular on the ends of the supporting surface 41 in and counter to the conveying direction. This is described in greater detail in the following in particular in conjunction with FIG. 6A to 6E.

The lateral supporting surfaces 41 of adjacent connection devices 40 can be arranged one behind the other along the conveyor chain 150 so closely that they come into contact and/or overlap on the inside of the curve at least when being guided around the curve. This provides a contiguous rolling surface for the statically fixed lateral supporting rollers 130 that faces the curve midpoint or the spiral axis W at least when being guided around a curve and is configured substantially gap-free.

This rolling surface, which is provided by the lateral supporting surfaces 41 of the individual transport attachments 1, is formed substantially in the conveying direction, but slightly offset from the curve midpoint, and along a vertical direction.

Likewise, FIG. 2C shows some of the free supporting points 31 and an occupied supporting point 31, on which a load-bearing roller 30 is arranged.

Figure 3:
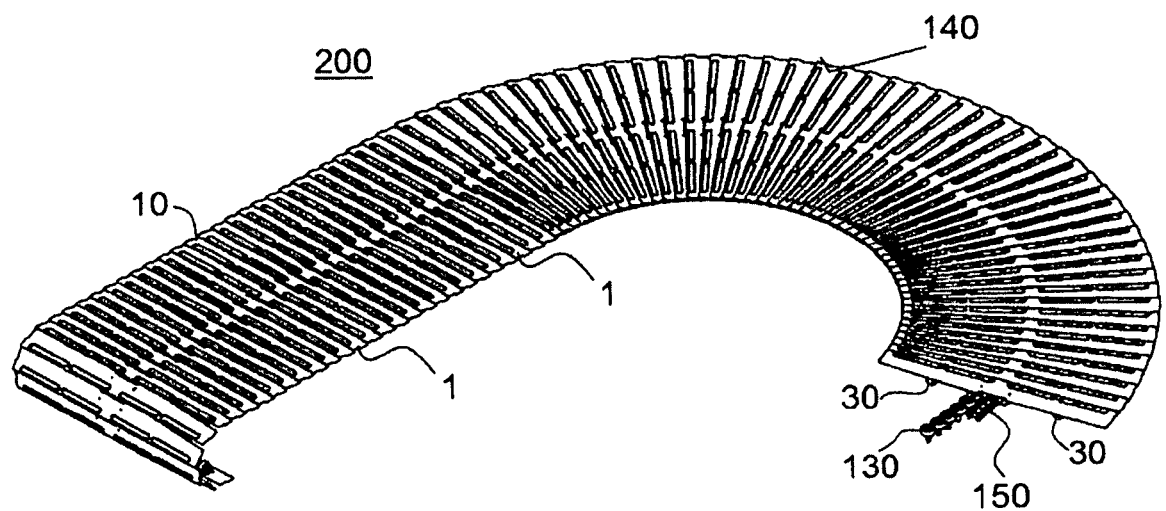
FIG. 3 is a perspective view of the second plate conveyor comprising a conveying surface which is guided around a curve.

FIG. 3 is a perspective view of parts of the second plate conveyor 200. FIG. 3 shows a similar detail as FIG. 2A, for example, merely in a perspective view. At one end of the straight course of the plate conveyor 200, it is shown how the transport attachments 1 are deflected downwards to return the conveyor chain 150 below the conveying surface 140. As in FIGS. 2A and 2B, track boundaries, side guides and/or track surfaces etc. are not shown in FIG. 3. These elements of the second plate conveyor 200 may be similar or identical to those of the first plate conveyor 100 shown in FIG. 1A to 1D.

Figure 4:
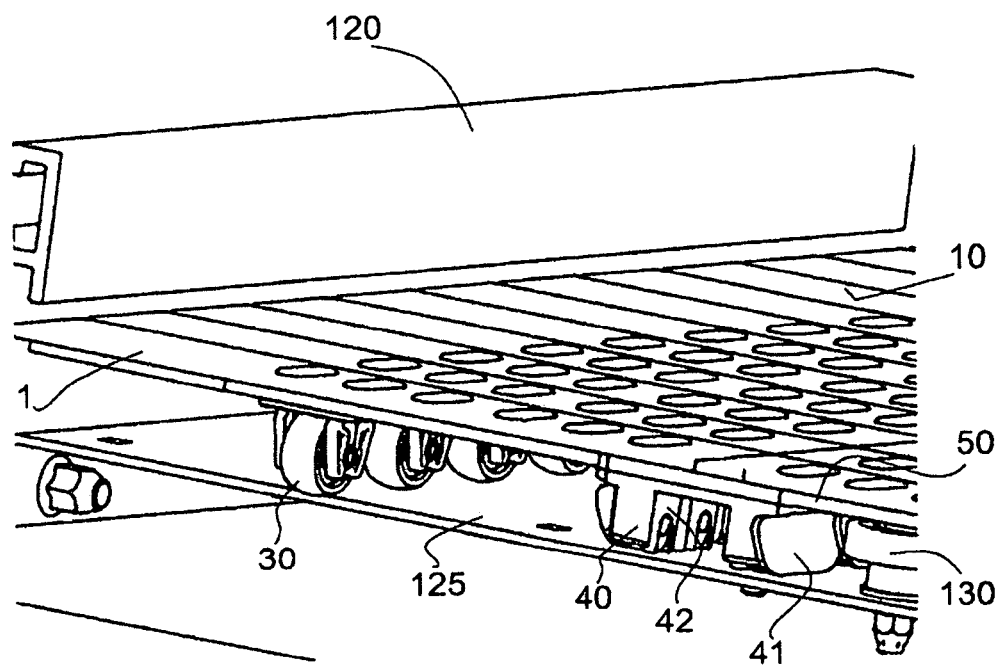
FIG. 4 is a perspective view of an enlarged detail of a plate conveyor without a conveyor chain.

FIG. 4 is a perspective view of a detail of the second plate conveyor 200 without a driven conveyor chain 150 but with some elements of the track surface 125, above which the driven conveyor chain 150 is guided. Therefore, a part of the track surface 125 is in particular shown which is arranged in a substantially horizontal plane. The track surface 125 is arranged substantially in parallel to and below the conveying surface 140 and is configured to be approximately the same size. The track surface 125 defines the conveyor track of the plate conveyor 100 or 200 and can be used for rolling and supporting the load-bearing rollers 30, which are arranged on the underside 20 of the transport attachments 1 and bear weight force of the transport attachments 1, the floatingly guided conveyor chain 150 and/or the material to be conveyed.

The connection device 40, which comprises the lateral supporting surface 41 as a rolling surface for the lateral supporting rollers 130, is shown approximately centrally below a transport plate 50 of the transport attachments 1. The lateral supporting rollers 130 may be fastened on and/or to the track surface 125, e.g. by means of a screw connection and/or a welded connection.

The conveyor chain 150 is not shown in FIG. 4, which allows for a view of an inner cavity in the connection device 40. This cavity may be configured as a traction-element receptacle for the conveyor chain 150. At least one fastening element 42 is provided in the interior of the connection device 40, which element may for example be configured as a clip for clipping to the conveyor chain 150, in particular to a chain member of the conveyor chain 150. A clip connection allows for a form-fitting connection of the transport attachment 1 to the conveyor chain 150 that is simple to establish and easy to detach.

Instead of a conveyor chain 150, another traction medium may be used, such as a steel cable and/or a rubber block chain.

In the operating position, the central axis of the conveyor chain 150 may be arranged to be deeper than the midpoint of the statically fixed lateral supporting rollers 130. As a result, a tilting moment and thus contact pressure of the transport attachments together with the traction element is generated in the direction of the track surface 125 and thus prevents the transport attachments 1 from lifting up in an undesired manner.

In the operating position, the transport surfaces 10 are arranged below the side guides 120, which prevent and/or reduce lifting of the transport attachments 1 from the track surface 125 under the effect of an external force on one side, caused for example by material to be conveyed or foreign objects being positioned on one side of the transport surface. In the operating position, the transport surfaces 10 are arranged and/or spaced apart below the side guides 120 such that, without the effect of an external force on one side of the transport surface 10, the side guides 120 are substantially not in contact therewith, in order to keep friction, wear and noise generation to a minimum. They thus contribute to the floating guidance of the conveyor chain 150. The track surface 125, the side guides 120 and the lateral supporting rollers 130 constitute statically fixed elements of the plate conveyor 100 or 200.

Figure 5A:
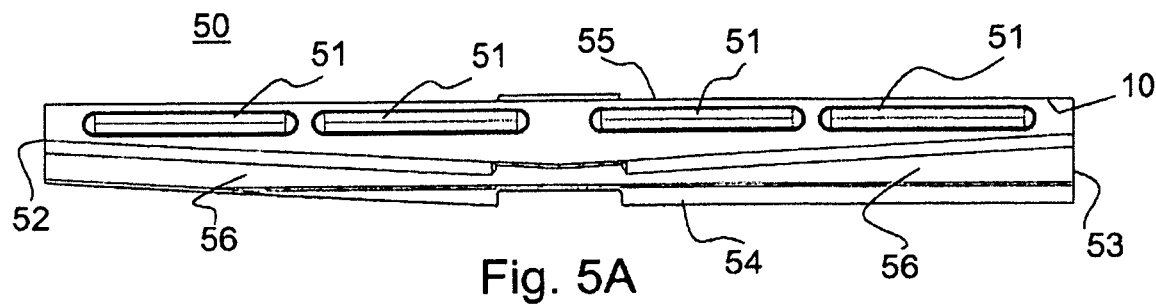
FIG. 5A is a view from above of a first embodiment of a transport plate of a transport attachment of a plate conveyor.

FIG. 5A is a view from above of the transport plate 50 of one of the transport attachments 1 according to a first exemplary embodiment. The view from above is a view onto the transport surface 10 of the transport plate 50. In the operating position, the transport surface 10 is oriented such that it points away from the traction element.

A plurality of rubberized portions 51 may be formed on the transport surface 10, which prevent and/or reduce material to be conveyed from shifting on the transport plates 50. This may in particular be advantageous when conveying over an incline (such as in the first plate conveyor 100). In the embodiment shown, a plurality of rubberized portions 51 are provided per transport plate 50, in particular four rubberized portions having an elongate design in the lateral extension transversely to the conveying direction.

The rubberized portions 51 may be configured as cast parts. The rubberized portions 51 may be introduced into the transport surface 10 by means of two-component casting.

At a plate end 54 of the transport plate 50 which is at the front when viewed in the conveying direction, the transport plate 50 is configured to be lowered over one step. As a result, a lower step is provided as a lowered surface 56 on the front plate end 54. The lowered surface 56 is lowered relative to a rear plate end 55 and can engage under a structurally identical transport plate 50 of a transport attachment 1 that is ahead in the conveying direction. As a result, it is possible for successive transport plates 50 to overlap, meaning that a substantially gap-free conveying surface 140 is then made possible.

At the plate end 55 which is at the rear when viewed in the conveying direction, an upper step is formed as a raised portion, under which the lowered surface 56 of the transport plate 50 of a following transport attachment 1 can be arranged in the operating position.

The transport plate 50 is asymmetrical at least in the views from above and from below. Specifically, the upper step in the transport plate 50, which forms the transport surface 10, is substantially symmetrical e.g. in the shape of an arrowhead (as shown in FIG. 5A). However, at least the lowered surface 56 may be asymmetrical.

The transport plate 50 has a lower width in the conveying direction on a lateral inner plate end 52 (on the inside of the curve) than on a lateral outer plate end 53 (on the outside of the curve). In this case, said two plate ends 52 and 53 are each arranged on laterally opposite ends of the transport plate 50. The transport plates 50 are asymmetrical and are intended to always point towards the curve midpoint and/or the spiral axis with the (narrower) inner plate end 52 and, accordingly, to point away from the curve midpoint and/or the spiral axis with the (wider) outer plate end 53. This results in an asymmetrical design of the transport plate 50. The inner plate end 52 is laterally spaced apart from a central region of the transport plate 50 and, when the plate conveyor 100 or 200 is being guided around a curve, faces towards the curve midpoint and/or the spiral axis W. The outer plate end 53 is likewise laterally spaced apart from the central region of the transport plate 50 and, when being guided around a curve, faces away from the curve midpoint and/or the spiral axis W.

Owing to the reduced width of the transport plate 50 on the plate end 52 on the inside of the curve, successive transport plates 50 can be closely nested together more easily, as shown on the inside of the curve in FIGS. 3 and 2A, for example. The transport plate 50 has a larger width on the outer plate end 53, which prevents gaps from forming even on the outside of the curve; cf. also FIGS. 3 and 2A.

In the exemplary embodiment shown, the entire wing of the transport plate 50 on the outside of the curve has a substantially constant width, specifically from a central region of the transport plate 50 towards the outer plate end 53. On the wing of the transport plate 50 on the inside of the curve, the width substantially continuously increases in the conveying direction from the plate end 52 on the inside of the curve towards the central region of the transport plate 50. This asymmetrical design, in particular of the lowered surface 56, makes particularly efficient and gap-free guidance around curves possible.

Figure 5B:
FIG. 5B is a view of the transport plate of a transport attachment of a plate conveyor counter to the conveying direction.

FIG. 5B is a side view of the transport plate 50 counter to the conveying direction. In this case, the rubber linings 51 protrude slightly above the transport surface 10, which can reduce shifting of material to be conveyed. Overall, the transport plate 50 is configured substantially as a planar plate, the thickness of which is considerably less, e.g. at least by 80%, preferably by at least 90%, than its lateral width and/or its width in the conveying direction.

Figure 5C:
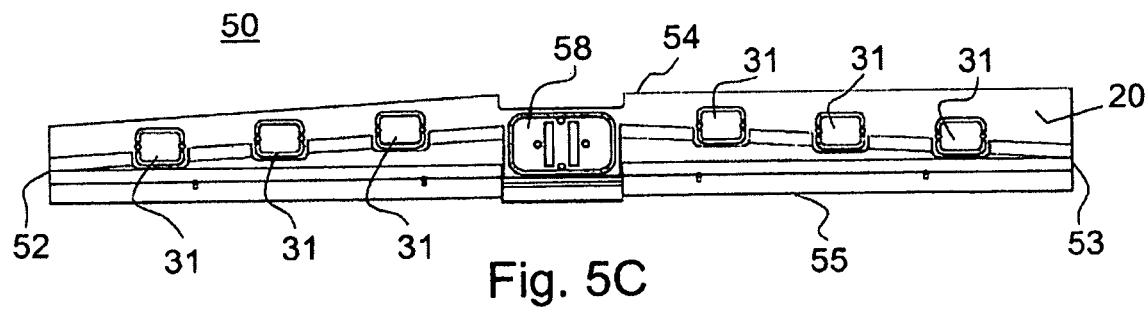
FIG. 5C is a view from below of the transport plate of a transport attachment of a plate conveyor.

FIG. 5C is a view from below of the transport plate 50. This figure in particular shows the underside 20 of the transport plate 50 having a total of six supporting points 31, on each of which a load-bearing roller 30 can be arranged. At least three supporting points 31 are formed and provided on each of the inner wing and the outer wing of the transport plate 50. A substantially rectangular central region 58 is formed in the center of the underside 20 of the transport plate 50, to which region the connection device 40 can be fastened. The central region 58 divides the transport plate 50 into two wings substantially in the center. As a result, the central region 58 can mark the start of the inner wing, which extends to the inner plate end 52, and the start of the outer plate wing, which extends to the outer plate end 53.

Figure 5D:
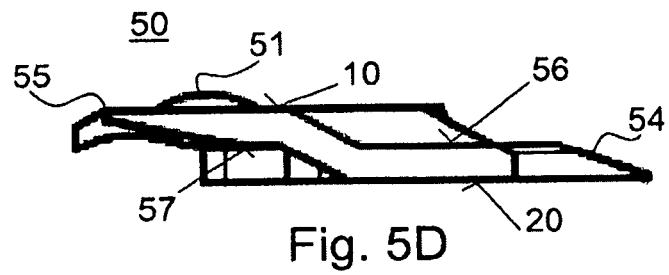
FIG. 5D is a side view of the transport plate of a transport attachment of a plate conveyor.

FIG. 5D is a side view of the transport plate 50, which is approximately Z-shaped in this view. Here, the lowered surface 56 is shown on the front plate end 54 in the form of a lower step which can be inserted below the raised portion 57 in the form of an upper step on the rear plate end 55 of a structurally identical transport attachment 1 that is ahead on the conveyor chain 150. As a result, the transport plates 50 can overlap. The stepped design in the side view of the transport plate 50 is shown in FIG. 5D. Only in the central region 58 can the stepped design either be completely omitted or shortened. The conveyor chain 150 is fastened to said central region 58, such that an almost unchanging distance can be set between successive transport plates 50.

Figure 6A:
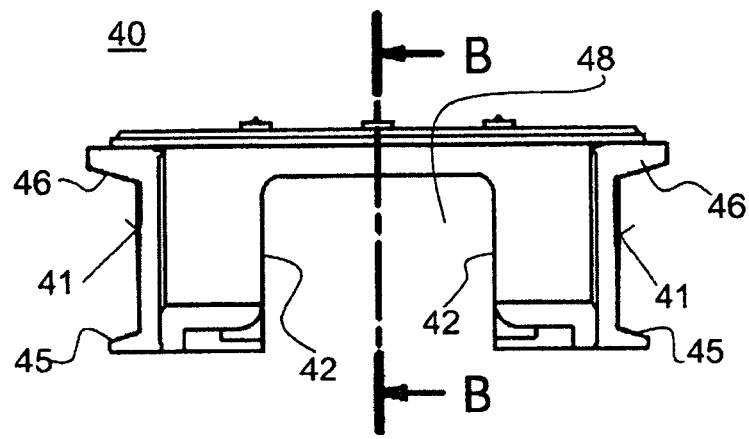
FIG. 6A is a view of a first embodiment of a connection device of a transport attachment of a plate conveyor counter to the conveying direction.
Figure 6B:
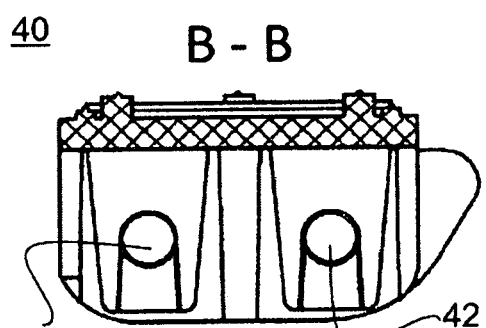
FIG. 6B is a sectional view along the line B-B indicated in FIG. 6A of the connection device of a transport attachment of a plate conveyor.
Figure 6C:
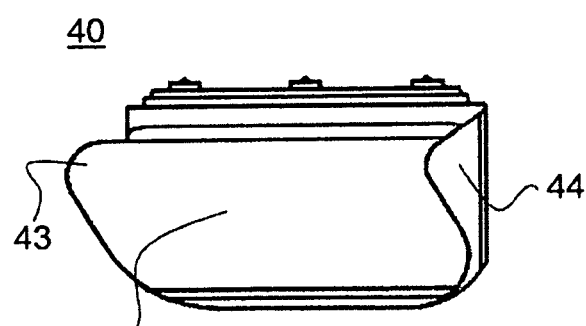
FIG. 6C is a side view of the connection device of a transport attachment of a plate conveyor.
Figure 6D:
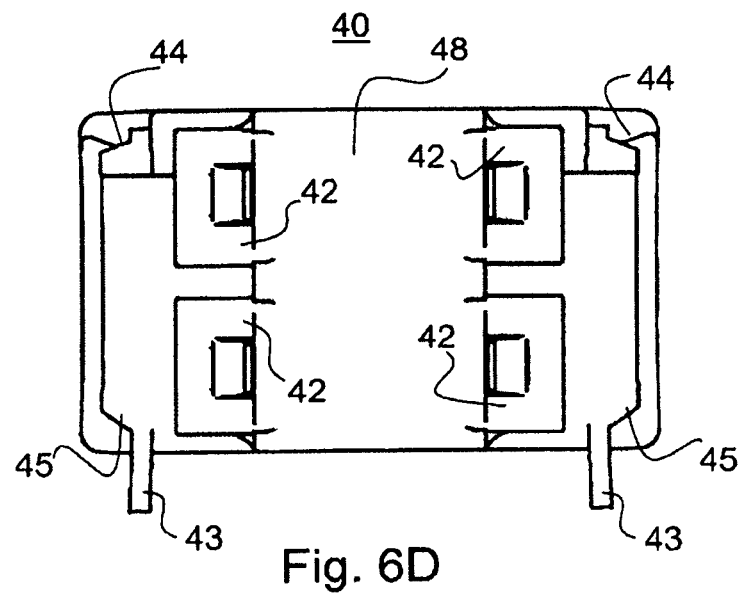
FIG. 6D is a view from below of the connection device of a transport attachment of a plate conveyor.
Figure 6E:
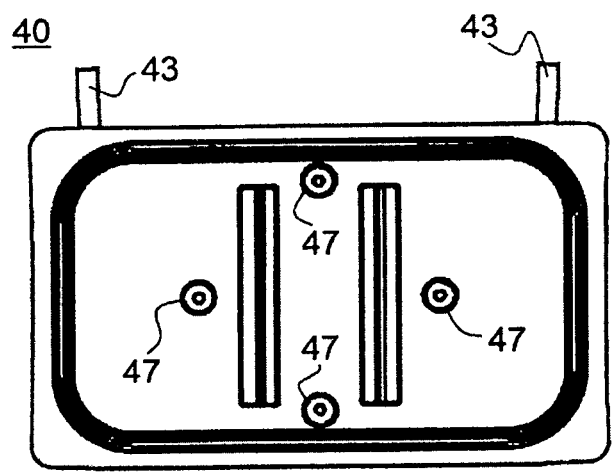
FIG. 6E is a view from above of the connection device of a transport attachment of a plate conveyor.

FIG. 6A to 6E show different views of the connection device 40 of the transport attachment 1 according to the first embodiment. FIG. 6A is a view of the connection device 40 counter to the conveying direction, FIG. 6B is a section along the plane B-B indicated in FIG. 6A, FIG. 6C is a side view, FIG. 6D is a view from below, and FIG. 6E is a view from above of the connection device 40.

The connection device 40 comprises a traction-element receptacle 48, which is configured as a recess and is intended to receive the conveyor chain 150. The traction-element receptacle 48 is configured to be elongate in the conveying direction. The connection device 40 may be substantially bracket-shaped and/or C-shaped around the traction-element receptacle 48. Fastening element 42 into which at least one chain member of the conveyor chain 150 can be clipped to at least in part are formed on lateral inner faces of the connection device 40 that face the traction-element receptacle 48.

Alternatively, another fastening to the conveyor chain 150 may be provided. Preferably, however, the fastening is at least form-fitting, in order for there not to allow for any slip between the driven conveyor chain 150 and the transport attachments 1. The lateral supporting surfaces 41 are formed on lateral outer surfaces of the connection device 40 (cf. FIG. 6A, for example). An upper projection 46 and a lower projection 45 are formed above and below the lateral supporting surfaces 41, respectively. These projections can interact with the lateral supporting rollers 130 and/or the chain guides 121, 122 such that guidance of the transport attachments 1 and thus of the conveyor chain 150 is provided in the vertical direction and/or lifting of the transport attachments 1 and thus of the conveyor chain 150 is restricted.

By means of the lower projection 45 below the lateral supporting surface 41, lift protection is provided which, in addition to the side guides 120, can make particularly efficient lift protection possible for the transport attachments 1.

As shown in particular in FIG. 6C, the lateral supporting surface 41 comprises a projection on a surface end 43 that is at the front when viewed in the conveying direction and comprises a recess on a surface end 44 that is at the rear when viewed in the conveying direction. The rounded projection on the front surface end 43 is substantially complementary to the rounded recess on the rear surface end 44, such that successive connection devices 40 can overlap at the front and rear surface ends.

This overlap of the lateral supporting surfaces 41 is, for example, also shown in FIG. 2C, in which the connection devices 40 are shown in horizontal section.

FIG. 6D shows that the connection device 40 comprises four fastening element 42, two of which are formed laterally opposite the traction-element receptacle 48 in each case. A pin and/or bolt of a chain member can be clipped into each two opposite fastening element 42. Two cross bolts or cross pins of the conveyor chain 150, which e.g. belong to one single chain member, can thus be completely received and fastened in the connection device 40.

For this purpose, each fastening element 42 may comprise at least one substantially circular recess having a lateral depth that points away from the traction-element receptacle; cf. also the sectional view in FIG. 6B. The internal diameter of the circular recesses may be adapted to the external diameter of the cross pins of the conveyor chain 150, i.e. may be complementary thereto (with or without clearance), for example. The fastening element 42 may comprise a body that is elongate in the vertical direction, the end of which that faces the transport plate 50 (i.e. that is at the top in the operating position) is rigid and the end of which that is facing away from the transport plate 50 (i.e. that is at the bottom in the operating position) is resilient in the lateral direction.

The fastening element 42 may be configured for latching of the conveyor chain 150. For this purpose, the conveyor chain 150 may comprise extended bolts, which protrude laterally from the conveyor chain 150. In this case, the bolts may protrude beyond the respective chain member at least by 10% of the lateral extension of the conveyor chain, for example. This allows particularly favorable latching and/or fastening to the fastening element 42.

FIG. 6E is a view from above of the connection device 40. Here, the front surface ends 43 protrude beyond the remainder of the connection device 40 in the conveying direction. A plurality of fastening points 47, for example four fastening points 47, are formed on the surface of the connection device 40. At the fastening points 47, the connection device 40 can be connected to the transport plate 50, in particular to the central region 48 of the transport plate 50. The connection device 40 may be fastened and/or may have been fastened, by its surface, to the underside 20 of the transport plate 50, in particular welded thereto, such that a cohesive connection is produced which is not detachable without being destroyed.

A sidebow chain may in particular be used as the conveyor chain 150, for example comprising extended (cross) bolts. The extended bolts can simplify the fastening to the connection device 40. A sidebow chain allows the chain to bend and thus allows for simplified guidance around curves with no risk or less risk of the chain becoming jammed.

The connection device 40 and/or the load-bearing rollers 30 may be fastened to the transport plate 50 by means of ultrasonic welding, for example. This constitutes a particularly stable type of cohesive connection that is simple to establish.

FIG. 7A to 7D show different views of a transport plate 50 of a transport attachment 1 according to a second embodiment. The transport plate 50 corresponds largely to the transport plate 50 according to the first embodiment, which is shown in FIG. 5A-5D. A difference between the transport plates 50 is formed on the central region 58. While the central region 58 of the transport plate 50 according to the first exemplary embodiment is configured for forming a cohesive weld connection with the connection device 40, an (e.g. first) part of a rail guide 60 is formed in the central region 58 of the transport plate 50 according to the second exemplary embodiment.

The rail guide 60 serves to fasten the transport plate 50 to the connection device 40. For this purpose, the rail guide 60 comprises a plurality of rails which are substantially parallel to the conveying direction on the underside 20 of the transport plate 50. The rail guide 60 may comprise both at least one plate rail projection 61 and at least one plate rail recess 62.

In the exemplary embodiment shown, the rail guide 60 comprises two plate rail projections 61, which are formed to extend away from the front plate end 54 towards the rear plate end 55. In addition, the rail guide 60 comprises two plate rail recesses 62, which are formed to extend away from the rear plate end 55 towards the front plate end 54. The two plate rail recesses 62 each already terminate at a stop 65 in front of (and thus spaced from) the front plate end 54. The stops 65 restrict insertion of connection rail projections 66 (cf. FIG. 8A to 8C) into the plate rail recesses 62 counter to the conveying direction.

Two side recesses 64 on the lateral sides of the central region 58 and thus of the rail guide 60 are parallel to the plate rail recesses 62 and are of the same length as said two plate rail recesses, and form the lateral sides of the rail guide 60.

The rail guide 60 further comprises a lock 63, which may e.g. be configured as a resilient clip. The lock 63 may be formed on the front plate end 54 and comprise a projecting latch.

Figure 7A:
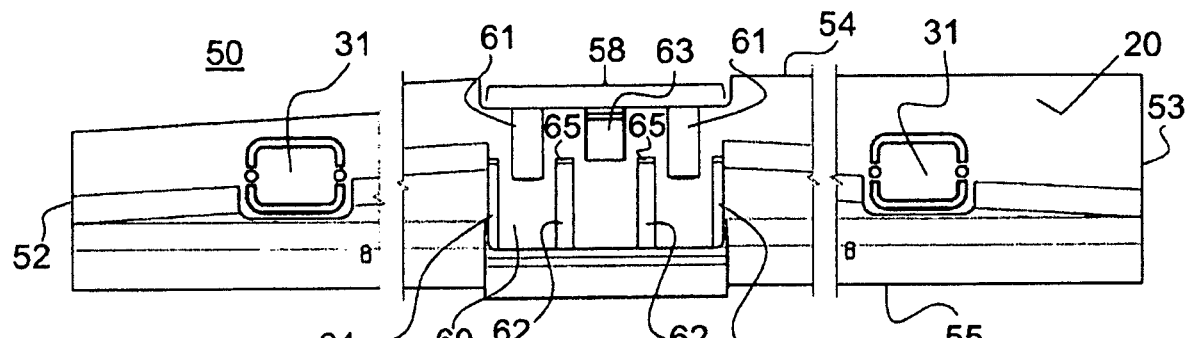
FIG. 7A is a view from below of a second embodiment of a transport plate of a transport attachment of a plate conveyor.
Figure 7B:
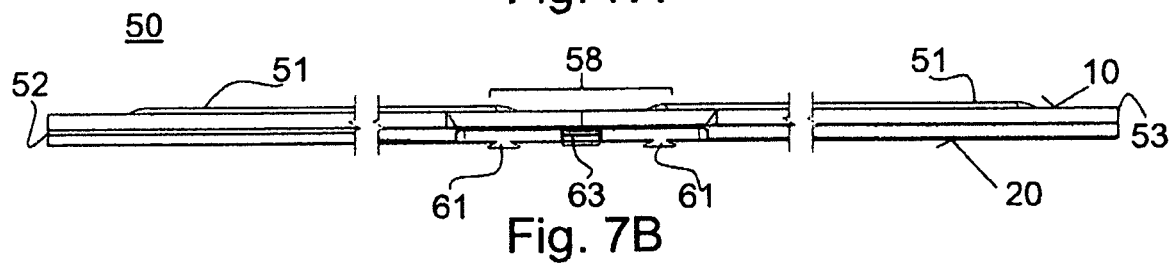
FIG. 7B is a view of the transport plate of a transport attachment of a plate conveyor counter to the conveying direction.
Figure 7C:
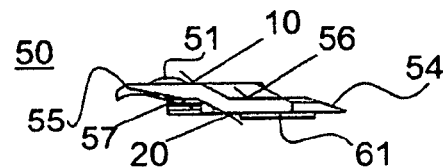
FIG. 7C is a side view of the transport plate of a transport attachment of a plate conveyor.
Figure 7D:
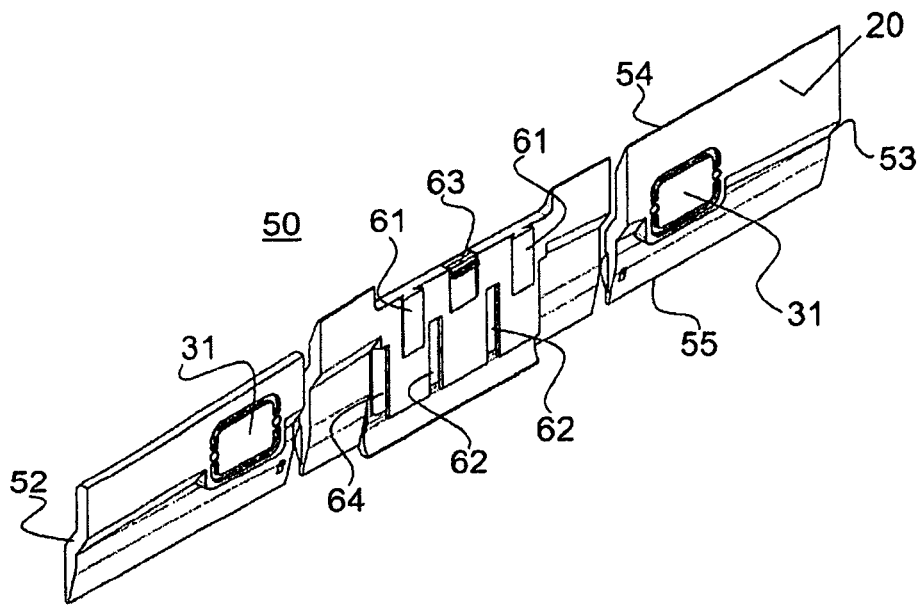
FIG. 7D is a perspective view of the transport plate of a transport attachment of a plate conveyor.

FIG. 7D is a side view showing that the plate rail projections 61 protrude from the underside 20 and project slightly downwards out of the underside 20.

Figure 8A:
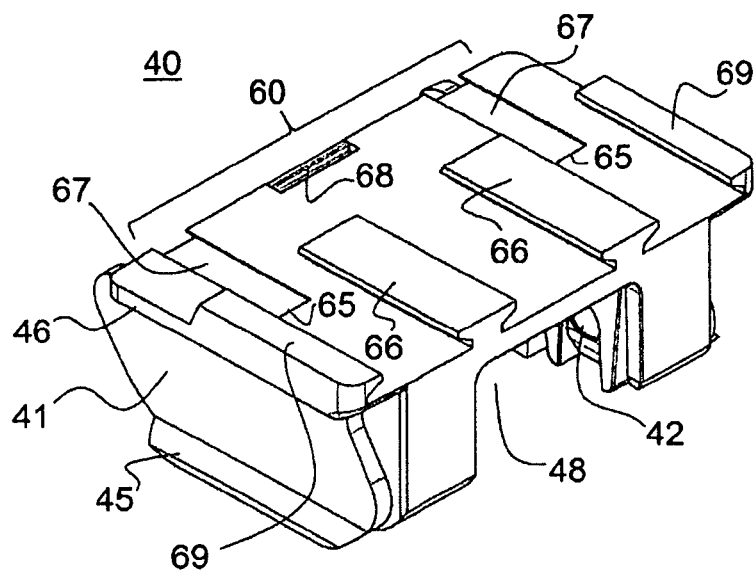
FIG. 8A is a perspective view of a second embodiment of a connection device of a transport attachment of a plate conveyor.
Figure 8B:
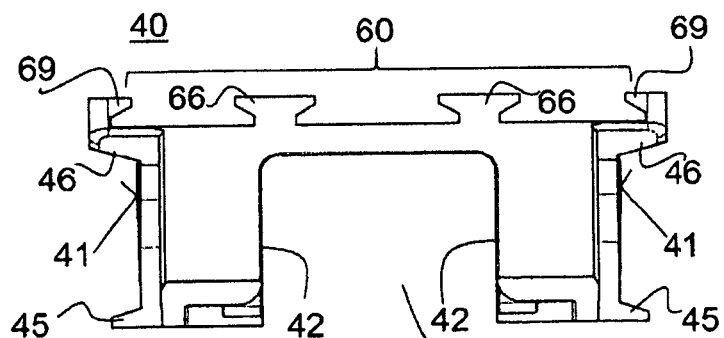
FIG. 8B is a view of the connection device of a transport attachment of a plate conveyor in the conveying direction.
Figure 8C:
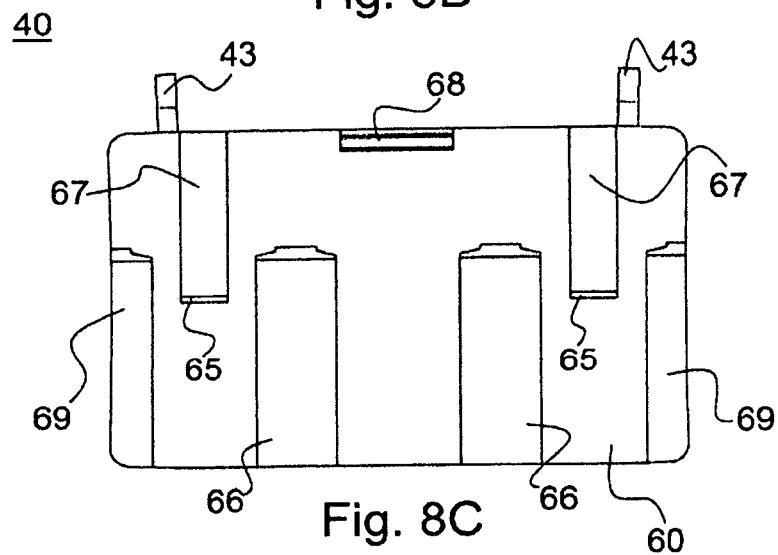
FIG. 8C is a view from above of the connection device of a transport attachment of a plate conveyor.

FIG. 8A to 8C are different views of a connection device 40 of a transport attachment 1 according to the second exemplary embodiment. The connection device 40 corresponds largely to the connection device 40 according to the first embodiment, which is shown in FIG. 6A-6E. A difference between the connection devices 40 is formed on the top of the connection device 40, i.e. on the connection region to the transport plate 50. While the connection region of the connection device 40 according to the first embodiment is configured for entering in a cohesive weld connection with the transport plate 50 (and may comprise e.g. fastening points 47 for this purpose), an (e.g. second) part of the rail guide 60 is formed in the central connection region of the connection device 40 according to the second embodiment.

The rail guide 60 also comprises a plurality of rails which are substantially parallel to the conveying direction on the top side of the connection device 40. The rail guide 60 may comprise at least one connection rail projection 66 and at least one connection rail recess 67.

In the second embodiment shown, the rail guide 60 comprises two connection rail projections 66, which extend away from the rear (when viewed in the conveying direction) end of the connection device 40 towards the front end. In addition, the rail guide 60 comprises two connection rail recesses 67, which extend away from the front end of the connection device 40 towards the rear end. The two connection rail recesses 67 each end at a stop 65 in front of (and thus spaced from) the rear end. These stops 65 restrict insertion of the two plate rail projections 61 (cf. FIG. 7A to 8D) into the connection rail recesses 67 in the conveying direction.

Two rail side guides 69 on the lateral sides of the rail guide 60 are parallel to the connection rail projections 66 and are the same length as said two connection rail projections. They form the lateral sides of the rail guide 60.

The rail guide 60 comprises a bar receptacle 68 on the connection device 40, in which receptacle the lock 63 can engage.

FIG. 8B is a view of the connection device 40 in the conveying direction, showing that both the connection rail projections 66 and the rail side guides 69 project upwards from the top of the connection device 40.

When connecting the transport plate 50 to the connection device 40 according to the second embodiment, the connection rail projections 66 of the connection device 40 are inserted into the plate rail recesses 62 in the transport plate 50 in the conveying direction until they reach the stops 65. The plate rail projections 61 of the transport plate 50 are inserted into the connection rail recesses 67 in the connection device 40 until they reach the stops 65. The rail side guides 69 of the connection device 40 are inserted into the side recess 64 in the transport plate 50, optionally until they reach suitable stops.

If the two components are correctly assembled, the lock 63 and the bar receptacle 68 lock and secure the component connection in a form-fitting manner.

Figure 9A:
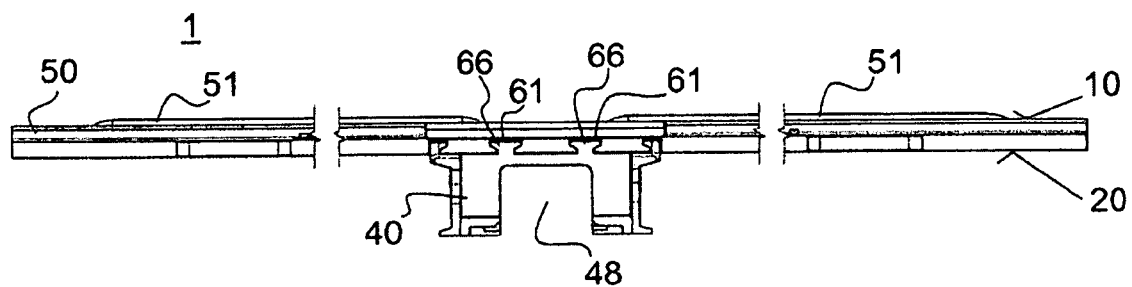
FIG. 9A is a view of the transport attachment according to the second embodiment in the conveying direction.

FIG. 9A is a view of the transport attachment 1 according to the second embodiment in the conveying direction, in which the transport plate 50 (as described) is form-fittingly connected to the connection device 40 by means of the rail guide 60. The connection may additionally be secured in a cohesive manner, e.g. by welding. However, the connection may also not be welded and may be configured to be detachable (e.g. by actuating and opening the lock 63). After opening the lock 63, the two assembled components of the transport attachment 1 can be detached from one another again. This may simplify maintenance and/or replacement of individual components and/or make it easier to access the traction element.

Figure 9B:
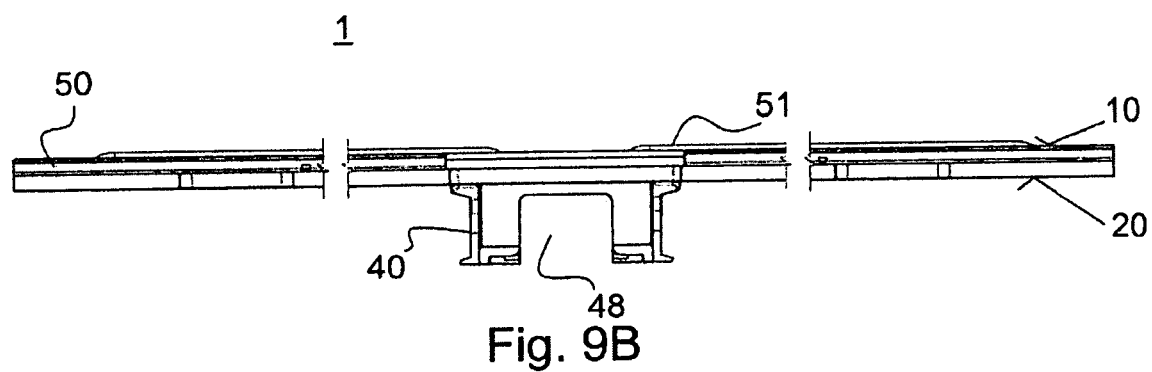
FIG. 9B is a view of the transport attachment according to the first embodiment in the conveying direction.

FIG. 9B is a view of the transport attachment 1 according to the first embodiment in the conveying direction. In this figure, the transport plate 50 shown in FIG. 5A-5D is bonded, e.g. welded, to the connection device 40 shown in FIG. 6A-6E. In this case, a particularly robust transport attachment 1 is provided.

LIST OF REFERENCE CHARACTERS 1 transport attachment
10 transport surface
20 underside
30 load-bearing roller
31 supporting point
40 connection device
41 lateral supporting surface
42 fastening element
43 front surface end
44 rear surface end
45 lower projection
46 upper projection
47 fastening points
48 traction-element receptacle
50 transport plate
51 rubberized portion
52 inner plate end
53 outer plate end
54 front plate end
55 rear plate end
56 lowered surface
57 raised portion
58 central region
60 rail guide
61 plate rail projection
62 plate rail recess
63 lock
64 side recess
65 stop
66 connection rail projection
67 connection rail recess
68 bar receptacle
69 rail side guide
100 plate conveyor
101 spiral column
103 spiral curve track
105 lower track end
107 upper track end
110 base
112 return surface
120 side guide
121 outer chain guide
122 inner chain guide
125 track surface
130 lateral supporting roller
140 conveying surface
150 conveyor chain
160 deflection roller
B track width
W spiral axis

The invention claimed is:

1. A transport attachment (1) for a plate conveyor (100; 200) for conveying material, comprising
a transport plate (50) for conveying the material on a transport surface (10) of the transport plate (50);
a connection device (40) comprising a fastening element (42) for fastening the transport attachment (1) to a driven traction element (150) of the plate conveyor (100; 200); and
at least one lateral supporting surface (41) for laterally supporting the transport attachment (1) in a curve of the plate conveyor (100; 200), wherein
the transport plate (50) is asymmetrical, such that a width of the transport plate (50) in a conveying direction of the plate conveyor (100; 200) at an inner plate end (52) is smaller than a width of the transport plate (50) in the conveying direction of the plate conveyor (100; 200) at an outer plate end (53).

2. The transport attachment of claim 1, wherein the lateral supporting surface (41) is configured to absorb a majority of necking forces directed towards a midpoint of the curve.

3. The transport attachment of claim 1, wherein the lateral supporting surface (41) is arranged such that a normal to the lateral supporting surface (41) in a curve of the plate conveyor (100; 200) points substantially horizontally relative to a curve midpoint of the curve (W).

4. The transport attachment of claim 1, wherein, in an operating position, the lateral supporting surface (41) is arranged in a plane that is spanned by a conveying direction of the plate conveyor (100; 200) and by a vertical direction.

5. The transport attachment of claim 1, wherein the traction element is a conveyor chain (150) and the fastening element (42) is configured for receiving at least one chain member of the conveyor chain (150) and further is configured such that the lateral supporting surface (41) is adjacent to the respectively received chain member such that, when the conveyor chain (150) is guided around a curve, the lateral supporting surface (41) is arranged between said received chain member and a curve midpoint (W).

6. The transport attachment of claim 1, wherein the lateral supporting surface (41) comprises a front surface end (43) at a front in a conveying direction and a rear surface end (44) at a rear in the conveying direction, the front and rear surface ends (43, 44) being adapted to one another such that the rear surface end (44) of the supporting surface (41) can be brought into engagement with the front surface end (43) of a supporting surface (41) of a structurally identical transport attachment (1) that is following in the conveying direction.

7. The transport attachment of claim 1, wherein the transport plate (50) is at least 20% wider on the outer plate end (53) in the conveying direction than on the inner plate end (52).

8. The transport attachment of claim 1, wherein the transport plate (50) is fastened to the connection device (40) in a form-fit manner.

9. The transport attachment of claim 8, wherein the transport plate (50) is detachably fastened to the connection device (40) by means of a lockable and/or latchable rail guide (60).

10. The transport attachment of claim 8, wherein the transport plate (50) is cohesively connected to the connection device (40).

11. The transport attachment of claim 8, wherein the connection device (40) is arranged substantially centrally below the transport plate (50).

12. The transport attachment of claim 1, wherein
the transport plate (50) comprises two wings that extend away from a central region (48) of the transport plate (50) transversely to a conveying direction of the plate conveyor (100; 200);
the transport attachment (1) comprises at least one load-bearing roller (30) per wing of the transport plate (50), and
the load-bearing rollers (30) each comprise a substantially horizontally arranged axis of rotation.

13. The transport attachment of claim 12, wherein a plurality of supporting points (31) are formed on each wing below the transport plate (50), each of the supporting points (31) being configured to apply at least one load-bearing roller (30).

14. A traction element (150) for a plate conveyor (100; 200) comprising a plurality of the transport attachments (1) of claim 1 that are fastened to the traction element (150).

15. The traction element of claim 14, wherein the transport attachments (1) are fastened to the traction element (150) one behind the other in a conveying direction of the plate conveyor (100; 200) so closely that the transport plates (50) of successive transport attachments (1) overlap with one another in a gap-free manner when being guided around a curve along a predetermined curve shape.

16. A plate conveyor (100; 200) comprising the traction element (150) of claim 14.

17. The plate conveyor of claim 16, wherein the traction element (150) is guided by the plate conveyor (100) along a spiral curve track (103).

18. The plate conveyor of claim 17, comprising a plurality of lateral supporting rollers (130) arranged on the spiral curve track (103) of the plate conveyor for supporting the lateral supporting surfaces (41) of the transport attachments (1) guided along the spiral curve track (103).

19. The plate conveyor of claim 17, wherein the spiral curve track (103) is reinforced with metal strips that have a horizontal strip width that is less than approximately 50% of the lateral track width (B) of the plate conveyor (100; 200).

20. A transport attachment (1) for a plate conveyor (100; 200) for conveying material, comprising:
a transport plate (50) for conveying the material on a transport surface (10) of the transport plate (50);
a connection device (40) comprising a fastening element (42) for fastening the transport attachment (1) to a driven traction element (150) of the plate conveyor (100; 200); and
at least one lateral supporting surface (41) for laterally supporting the transport attachment (1) in a curve of the plate conveyor (100; 200), wherein
the transport plate (50) is stepped in a conveying direction such that a rear plate end (55) of the transport plate (50) overlaps at least in part with a front plate end (54) of a transport plate (55) of a structurally identical transport attachment (1) that is following in the conveying direction.

21. A traction element (150) for a plate conveyor (100; 200) comprising a plurality of the transport attachments (1) of claim 20 that are fastened to the traction element (150).

22. A method for conveying material to be conveyed along a plate conveyor (100; 200), comprising the steps of:
connecting and/or fastening a plurality of transport attachments (1) to a driven traction element (150) of the plate conveyor (100; 200);
providing a conveying surface (140) for conveying the material to be conveyed, the surface being formed by a plurality of transport surfaces (10) that are provided by transport plates (50) of the transport attachments (1), each of the transport plates (50) being asymmetrical, such that a width of each of the transport plates (50) in a conveying direction of the plate conveyor (100; 200) at an inner plate end (52) is smaller than a width of each of the transport plates (50) in the conveying direction of the plate conveyor (100; 200) at an outer plate end (53);
guiding the traction element (150) and the transport attachments (1) attached thereto along a curve; and
laterally supporting the transport attachments (1) fastened to the traction element (150) in the curve by means of at least one lateral supporting surface (41) that is provided by at least one of the transport attachments (1).

* * * * *